(12) United States Patent
Yu

(10) Patent No.: US 11,904,976 B2
(45) Date of Patent: Feb. 20, 2024

(54) COLLAPSIBLE ELECTRIC VEHICLE, VEHICLE FRAME FOR SAME, AND VEHICLE FRAME LOCK

(71) Applicant: Beijing Onemile Technology Co., Ltd., Beijing (CN)

(72) Inventor: Lin Yu, Beijing (CN)

(73) Assignee: Beijing Onemile Technology Co., Ltd., Beijing (CN)

( * ) Notice: Subject to any disclaimer, the term of this patent is extended or adjusted under 35 U.S.C. 154(b) by 350 days.

(21) Appl. No.: 17/283,541

(22) PCT Filed: Oct. 9, 2018

(86) PCT No.: PCT/CN2018/109468
§ 371 (c)(1),
(2) Date: Apr. 7, 2021

(87) PCT Pub. No.: WO2020/073195
PCT Pub. Date: Apr. 16, 2020

(65) Prior Publication Data
US 2021/0387692 A1 Dec. 16, 2021

(30) Foreign Application Priority Data

Oct. 8, 2018 (CN) .......................... 201811168424.3
Oct. 8, 2018 (CN) .......................... 201821631407.4

(51) Int. Cl.
*B62K 15/00* (2006.01)
*B62K 11/00* (2006.01)

(52) U.S. Cl.
CPC ............ *B62K 15/008* (2013.01); *B62K 11/00* (2013.01); *B62K 2204/00* (2013.01)

(58) Field of Classification Search
CPC .... B62K 11/00; B62K 15/008; B62K 15/006; B62K 2204/00
See application file for complete search history.

(56) References Cited

U.S. PATENT DOCUMENTS

| | | | |
|---|---|---|---|
| 7,021,413 B1* | 4/2006 | Lee | B62M 6/60 180/181 |
| 2007/0187922 A1* | 8/2007 | Boutakis | B62K 15/008 280/287 |
| 2016/0244120 A1* | 8/2016 | Gerencsér | B62K 15/008 |
| 2017/0158279 A1* | 6/2017 | Xie | B62J 43/16 |
| 2017/0259871 A1* | 9/2017 | Delgatty | B62J 1/04 |
| 2020/0234673 A1* | 7/2020 | Yan | G09G 5/391 |

* cited by examiner

*Primary Examiner* — Tony H Winner

(57) ABSTRACT

A collapsible electric vehicle includes a front vehicle member, a vehicle frame pivotally coupled to the front vehicle member, a seat disposed at the vehicle frame, a power supply, a set of wheels disposed at the front vehicle member and the vehicle frame respectively, and a drive motor eclectically connected to the power supply. The drive motor is connected to at least one of the wheels to drive the wheel to rotate. The collapsible electric vehicle has an expanded state and a collapsed state. In the expanded state, a first supporting frame is expanded and maintained upright to support the seat to be at a suitable position while the front vehicle member is expanded to be positioned apart from the vehicle frame. In the collapsed state, the first supporting frame is collapsed to a main frame, and the front vehicle member is collapsed to the first supporting frame.

31 Claims, 14 Drawing Sheets

COLLAPSIBLE ELECTRIC VEHICLE, VEHICLE FRAME FOR SAME, AND VEHICLE FRAME LOCK

CROSS REFERENCE OF RELATED APPLICATION

This is a non-provisional application that claims priority to international application number PCT/CN2018/109468, international filing date of Oct. 9, 2018, which claims priority to a first Chinese application number CN201811168424.3, filing date of Oct. 8, 2018 and a second Chinese application number CN201821631407.4, filing date of Oct. 8, 2018, the entire contents of each of which are expressly incorporated herein by reference.

BACKGROUND OF THE PRESENT INVENTION

Field of Invention

The present invention relates to an electric vehicle, and more particularly to a vehicle frame of an electric vehicle. The present invention further relates to a vehicle frame lock of a collapsible electric vehicle, wherein the vehicle frame lock is configured to lock up the collapsible electric vehicle at an expanded state so as to retain the collapsible electric vehicle at the expanded state.

DESCRIPTION OF RELATED ARTS

An electric vehicle is a transporting tool powered and driven by electrical power for transporting a user from places to places. Conventional electric vehicles, such as electric bicycles, electric scooters, or electric carts, are powered by a power source for providing electricity. Generally speaking, a collapsible electric vehicle is a vehicle adapted to be folded or collapsed to minimize a size thereof for easy transportation and storage. Most of the collapsible electric vehicles are constructed by a collapsible frame to enable the collapsible electric vehicle being folded or collapsed, such that size of the collapsible electric vehicle is minimized for easy transportation when it is collapsed.

In order to meet the desired requirements of the collapsible electric vehicle, the collapsible frame should have good collapsibility, safety structural configuration, and simple structural configuration with easy folding/unfolding operations. The good collapsibility of the collapsible electric vehicle is to minimize the size of the collapsible electric vehicle after being collapsed, such that the user is able to conveniently carry and store the collapsible electric vehicle. The safety structural configuration of the collapsible electric vehicle is to provide a rigid structural support to stably support the user and to provide a safety driving condition when the collapsible electric vehicle is in use (or in an expanded state). The easy folding/unfolding operation of the collapsible electric vehicle requires simple and easy implementation of the folding/unfolding steps of the collapsible electric vehicle to move the collapsible electric vehicle between the expanded state and the collapsed state. However, most of the existing collapsible electric vehicles fail to achieve all the objectives including the good collapsibility, safety structural configuration, and simple structural configuration with easy folding/unfolding operations. For example, some existing collapsible electric vehicles can achieve the objectives of good collapsibility and easy folding/unfolding operation, but they fail to provide the safety structural configuration. Likewise, some existing collapsible electric vehicles can achieve the objectives of good collapsibility and safety structural configuration, but they fail to provide the feature of easy folding/unfolding operation. Obviously, the former example will be dangerous for the use of collapsible electric vehicles, especially under the riding conditions, while the latter example will provide a complicated folding or unfolding operation of the collapsible electric vehicles, such that it is a burden for the user to use the collapsible electric vehicles so as to provide bad user experience.

Chinese application number, CN201610658603.X, discloses a collapsible electric vehicle which comprises a frame enabling the collapsible electric vehicle to be collapsed in order to reduce its size. In addition, the collapsible electric vehicle further comprises a lock that locks up the frame when the frame is moved at its collapsed state. However, the lock is releasable when the frame is locked by the lock at the collapsed state of the collapsible electric vehicle, wherein an operating end of the lock is outwardly protruded from the frame, such that the lock can be released and unlocked when the operating end of the lock is accidentally or unintentionally actuated. As a result, the collapsible electric vehicle is unsafe for being used. Furthermore, the lock of the collapsible electric vehicle fails to correctly or properly lock up an upper end of the vehicle frame and a lower end of the rear frame together. The false operation of the lock will be dangerous for the user when the user rides the collapsible electric vehicle. In fact, such collapsible electric vehicle does not disclose any safety configuration according to this lock issue.

SUMMARY OF THE PRESENT INVENTION

The invention is advantageous in that it provides a collapsible electric vehicle, wherein a vehicle frame of the collapsible electric vehicle can be actuated between a folded position and an unfolded position. When the vehicle frame is folded, the collapsible electric vehicle is collapsed to reduce the size of the collapsible electric vehicle with a compact size for easily carriage. When the vehicle frame is unfolded, the collapsible electric vehicle is expanded to provide a rigid and stable support for a user or rider to ride the collapsible electric vehicle. In other words, when the vehicle frame is folded, the entire collapsible electric vehicle is correspondingly folded to reduce the size thereof.

Another advantage of the invention is to provide a collapsible electric vehicle, wherein the power supply control of the driving mechanism is configured by dual power switches. Accordingly, the driving mechanism is activated at a power supply control mode only when the switches are in a closed condition to prevent any power supply error and unexpected driving operation of the collapsible electric vehicle when the collapsible electric vehicle is incompletely or improperly unfolded so as to improve the safety of the collapsible electric vehicle.

Another advantage of the invention is to provide a collapsible electric vehicle, wherein the driving mechanism of the collapsible electric vehicle comprises at least one power switch provided at the vehicle frame and arranged to be closed and switched on only when the vehicle frame of the collapsible electric vehicle is unfolded. In other words, the electric power supply circuit of the collapsible electric vehicle is operatively connected only when the vehicle frame of the collapsible electric vehicle is unfolded. When the vehicle frame of the collapsible electric vehicle is folded, the power supply of the driving mechanism of the collapsible electric vehicle is automatically cut off so as to prevent an unintentionally driving of the collapsible electric vehicle and to improve the safety of the collapsible electric vehicle.

Another advantage of the invention is to provide a collapsible electric vehicle, wherein when the vehicle frame of the collapsible electric vehicle is unfolded, the power switch provided at the vehicle frame is pressed by the vehicle frame, such that the power switch is switched on to maintain the electric power supply circuit of the collapsible electric vehicle being connected. When the vehicle frame of the collapsible electric vehicle is folded, the power switch provided at the vehicle frame is switched off to cut off the electric power supply circuit of the collapsible electric vehicle.

Another advantage of the invention is to provide a collapsible electric vehicle, wherein when the vehicle frame of the collapsible electric vehicle is unfolded, the vehicle frame of the collapsible electric vehicle is retained at the unfolded position by a vehicle frame lock, such that the vehicle frame of the collapsible electric vehicle is securely locked at the unfolded position to provide a rigid and stable support for the rider.

Another advantage of the invention is to provide a collapsible electric vehicle, wherein the vehicle frame of the collapsible electric vehicle is unfolded, the vehicle frame of the collapsible electric vehicle is retained at the unfolded position by two locking configurations to ensure the vehicle frame being unfolded and to provide a rigid and stable support for the rider.

Another advantage of the invention is to provide a collapsible electric vehicle, wherein the vehicle frame of the collapsible electric vehicle is folded, the vehicle frame is retained at the folded position by a locking assembly to ensure and maintain the collapsible electric vehicle at the collapsed state.

Another advantage of the invention is to provide a collapsible electric vehicle, wherein when the vehicle frame of the collapsible electric vehicle is folded, the entire collapsible electric vehicle is currently driven to be folded by the folding movement of the vehicle frame, so as to reduce the size of the collapsible electric vehicle.

Another advantage of the invention is to provide a collapsible electric vehicle, wherein the vehicle frame lock of the collapsible electric vehicle has a simple structural configuration and is easy to operate, such that the collapsible electric vehicle can be easily folded and unfolded.

Another advantage of the invention is to provide a vehicle frame of a collapsible electric vehicle, wherein when the vehicle frame of the collapsible electric vehicle is unfolded, the first supporting frame of the vehicle frame is retained and locked at the unfolded position by a vehicle frame lock, so as to retain the collapsible electric vehicle at the expanded state and to provide a rigid and stable support for the rider.

Another advantage of the invention is to provide a vehicle frame of a collapsible electric vehicle, wherein when the vehicle frame of the collapsible electric vehicle is folded, the vehicle frame is retained and locked at the folded position by a locking assembly, so as to retain the collapsible electric vehicle at the collapsed state.

Another advantage of the invention is to provide a vehicle frame of a collapsible electric vehicle, wherein the vehicle frame is coupled at the front vehicle member of the collapsible electric vehicle, such that when the vehicle frame is unfolded, the first supporting frame, the second supporting frame and the main frame form a stable triangular structure.

Another advantage of the invention is to provide a vehicle frame of a collapsible electric vehicle, wherein a power switch is provided at the vehicle frame to control a power supply to the driving mechanism of the collapsible electric vehicle, such that the user or rider is able to control power supply to the driving mechanism via the folding and unfolding of the vehicle frame.

Additional advantages and features of the invention will become apparent from the description which follows and may be realized by means of the instrumentalities and combinations particular point out in the appended claims.

According to the present invention, the foregoing and other objects and advantages are attained by a collapsible electric vehicle, comprising:

a front vehicle member;
a vehicle frame, wherein the front vehicle member is pivotally coupled to the vehicle frame;
a seat, wherein the seat is supported by the vehicle frame;
a power supply;
a plurality of wheels provided at the front vehicle member and the vehicle frame respectively; and
a driving mechanism, wherein the power supply is electrically connected to the driving mechanism for providing power to the driving mechanism, wherein the driving mechanism is operatively connected to at least one of the wheels to drive the wheel to rotate, wherein the vehicle frame comprises a main frame and a first supporting frame, wherein the first supporting frame is coupled at the main frame to move the collapsible electric vehicle between an expanded state and a collapsed state, wherein when the collapsible electric vehicle is in the expanded state, the first supporting frame of the vehicle frame is unfolded and retained at an upright manner while the front vehicle member is unfolded to move away from the vehicle frame, wherein when the collapsible electric vehicle is in the collapsed state, the first supporting frame of the vehicle frame is folded on the main frame while the front vehicle member is folded on the first supporting frame.

Preferably, the main frame has a receiving channel, wherein when the collapsible electric vehicle is moved in the collapsed state, the first supporting frame of the vehicle frame is folded in the receiving channel of the main frame. Preferably, the main frame of the vehicle frame has a main frame front end and main frame rear end, wherein the front vehicle member is pivotally coupled at the main frame front end of the main frame of the vehicle frame while at least one wheel is coupled at the main frame rear end of the main frame of the vehicle frame.

In accordance with another aspect of the invention, the present invention comprises a vehicle frame of a collapsible electric vehicle, comprising:

a main frame; and
a first supporting frame, wherein the first supporting frame is coupled at the main frame, wherein the vehicle frame is moved between an unfolded position and a folded position, wherein when the vehicle frame is moved in the unfolded position, the first supporting frame of the vehicle frame is unfolded and retained at an upright manner for supporting a seat of the collapsible electric vehicle at a desired position, wherein when the vehicle frame is moved in the folded position, the first supporting frame of the vehicle frame is folded on the main frame.

In accordance with another aspect of the invention, the present invention comprises a vehicle frame lock of a collapsible electric vehicle, comprising:

a first positioning member; and a second positioning member, wherein the first positioning member is coupled at an upper end portion of a first supporting frame of a vehicle frame, wherein the second positioning member is coupled at a lower end portion of the first supporting frame, wherein the first and second positioning members are engaged with each other when the first supporting frame is unfolded and are disengaged with each other when the first supporting frame is folded.

In accordance with another aspect of the invention, the present invention comprises a vehicle frame lock of a collapsible electric vehicle, comprising:
a first engaging member; and
a second engaging member, wherein the second engaging member is coupled at a lower end portion of a first supporting frame, wherein the first and second engaging members are engaged with each other when the first supporting frame is unfolded and are disengaged with each other when the first supporting frame is folded.

In accordance with another aspect of the invention, the present invention comprises a power controlling method for a collapsible electric vehicle, comprising the following steps:
(A) Activate the collapsible electric vehicle, such as starting the collapsible electric vehicle.
(B) If the power controller of the collapsible electric vehicle receives an unfolding signal, the power controller is configured to allow the power of the power supply of the collapsible electric vehicle to be supplied to the driving mechanism of the collapsible electric vehicle according to a driving instruction. If the power controller of the collapsible electric vehicle does not receive the unfolding signal, the power controller is configured to stop or block the power of the power supply of the collapsible electric vehicle to be supplied to the driving mechanism of the collapsible electric vehicle.

In accordance with another aspect of the invention, the present invention comprises a power control system for a collapsible electric vehicle, comprising:
a power controller, wherein when the power controller receives an unfolding signal, the power of the power supply of the collapsible electric vehicle is supplied to the driving mechanism of the collapsible electric vehicle according to a driving instruction, wherein when the power controller does not receive the unfolding signal, the power of the power supply of the collapsible electric vehicle is stopped or blocked to be supplied to the driving mechanism of the collapsible electric vehicle.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
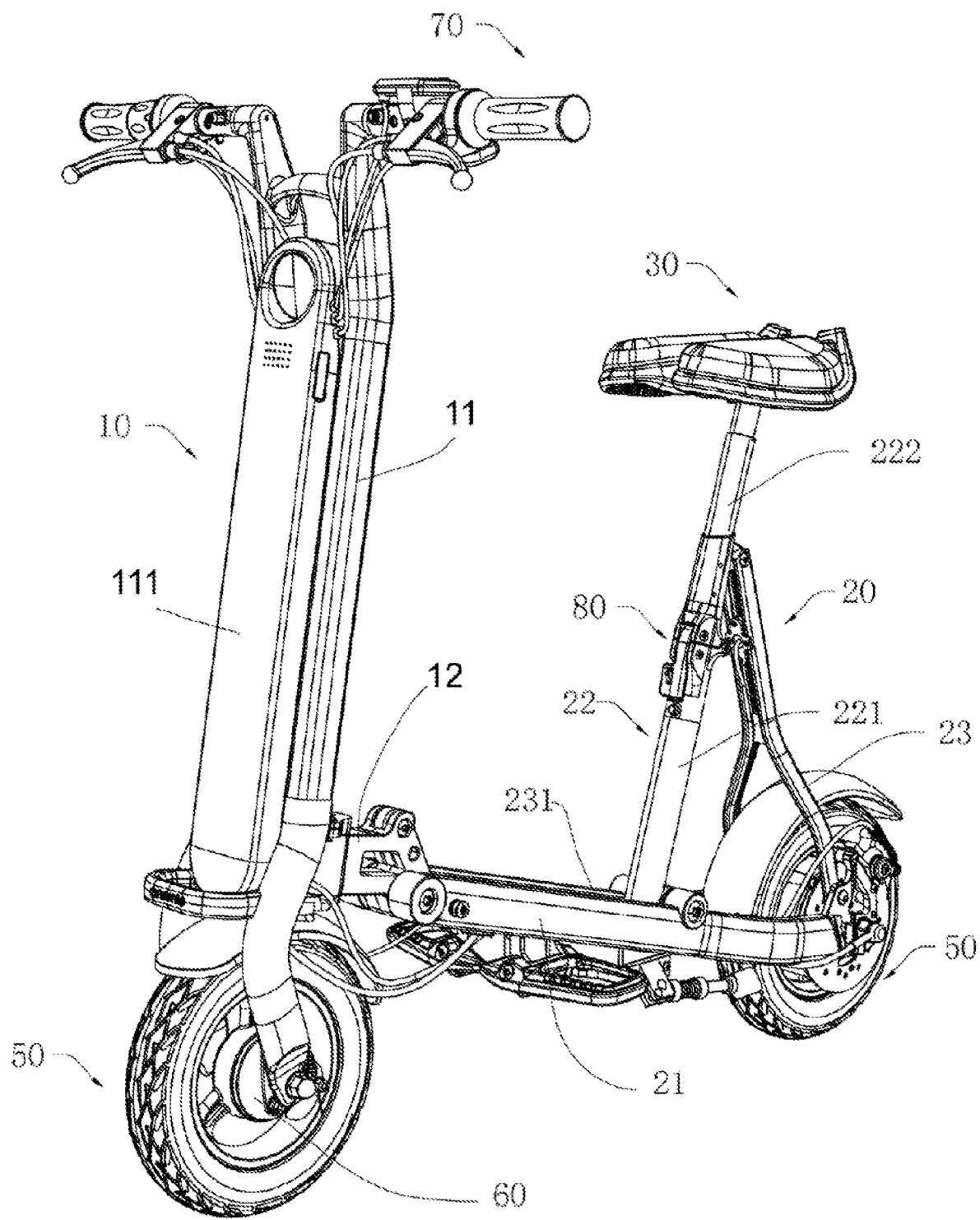
FIG. 1 is a perspective view of a collapsible electric vehicle according to a preferred embodiment of the present invention, illustrating the collapsible electric vehicle at an expanded state.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIGS. 1 to 7 of the drawings, a collapsible electric vehicle according to a preferred embodiment of the present invention is illustrated, wherein the collapsible electric vehicle comprises a front vehicle member 10, a vehicle frame 20, a seat 30, a power supply 40, a plurality of wheels 50, and a driving mechanism 60. The front vehicle member 10 is pivotally connected to the vehicle frame 20. The seat 30 is coupled at the vehicle frame 20. The driving mechanism 60 is electrically connected to the power supply 40, wherein the power supply 40 is arranged to supply electrical power to the driving mechanism 60. The driving mechanism 60 is operatively connected to at least one of the wheels 50 to drive the wheel 50 to rotate. It is worth mentioning that, as shown in FIGS. 1 to 5, the collapsible electric vehicle further comprises two handle frames 70, wherein a user is able to grip the handle frames 70 when riding the collapsible electric vehicle. Each of the handle frames 70 can be an individual component of the collapsible electric vehicle. Alternatively, the handle frames 70 can be integrated with the front vehicle frame 10 to form a one-piece integrated member.

As shown in FIGS. 1 to 7, the vehicle frame 20 of the collapsible electric vehicle comprises a main frame 21 and a first supporting frame 22, wherein the front vehicle member 10 is pivotally connected to the main frame 21 of the vehicle frame 20. The seat 30 is coupled at the first supporting frame 22, wherein when the collapsible electric vehicle is moved at an expanded state, the first supporting frame 21 is unfolded and retained in a vertical upright manner with respect to the main frame 21 to support the seat 30 at a proper position while the front vehicle member 10 is pivotally moved away from the vehicle frame 20. When the collapsible electric vehicle is moved at a collapsed state, the first supporting frame 21 is pivotally folded while the front vehicle member 10 is folded on the first supporting frame 21. Preferably, the main body 21 of the vehicle frame 20 has a receiving channel 210, wherein when the collapsible electric vehicle is moved at the collapsed state, the first supporting frame 22 of the vehicle frame 20 is folded to receive in the receiving channel 210. In other words, the receiving channel 210 of the vehicle frame 20 is configured to accommodate the first supporting frame 22 of the vehicle frame 20, such that the first supporting frame 22 can be pivotally folded into the receiving channel 210. It is appreciated that a length of the receiving channel 210 should not be shorter than a maximum length of the first supporting frame 22 when the first supporting frame 22 is folded.

Figure 2:
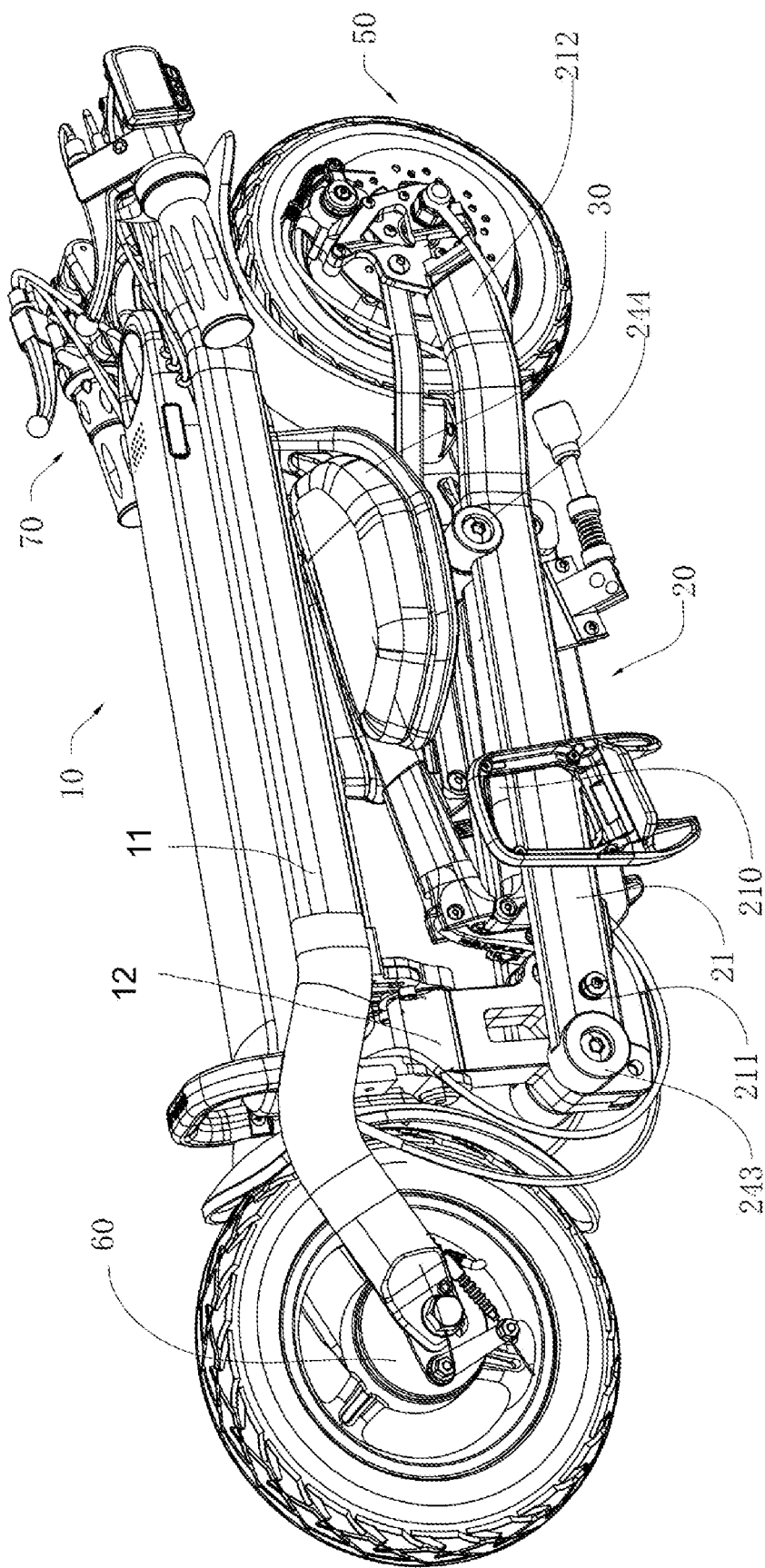
FIG. 2 is a perspective view of the collapsible electric vehicle according to the preferred embodiment of the present invention, illustrating the collapsible electric vehicle at a collapsed state.
Figure 3:
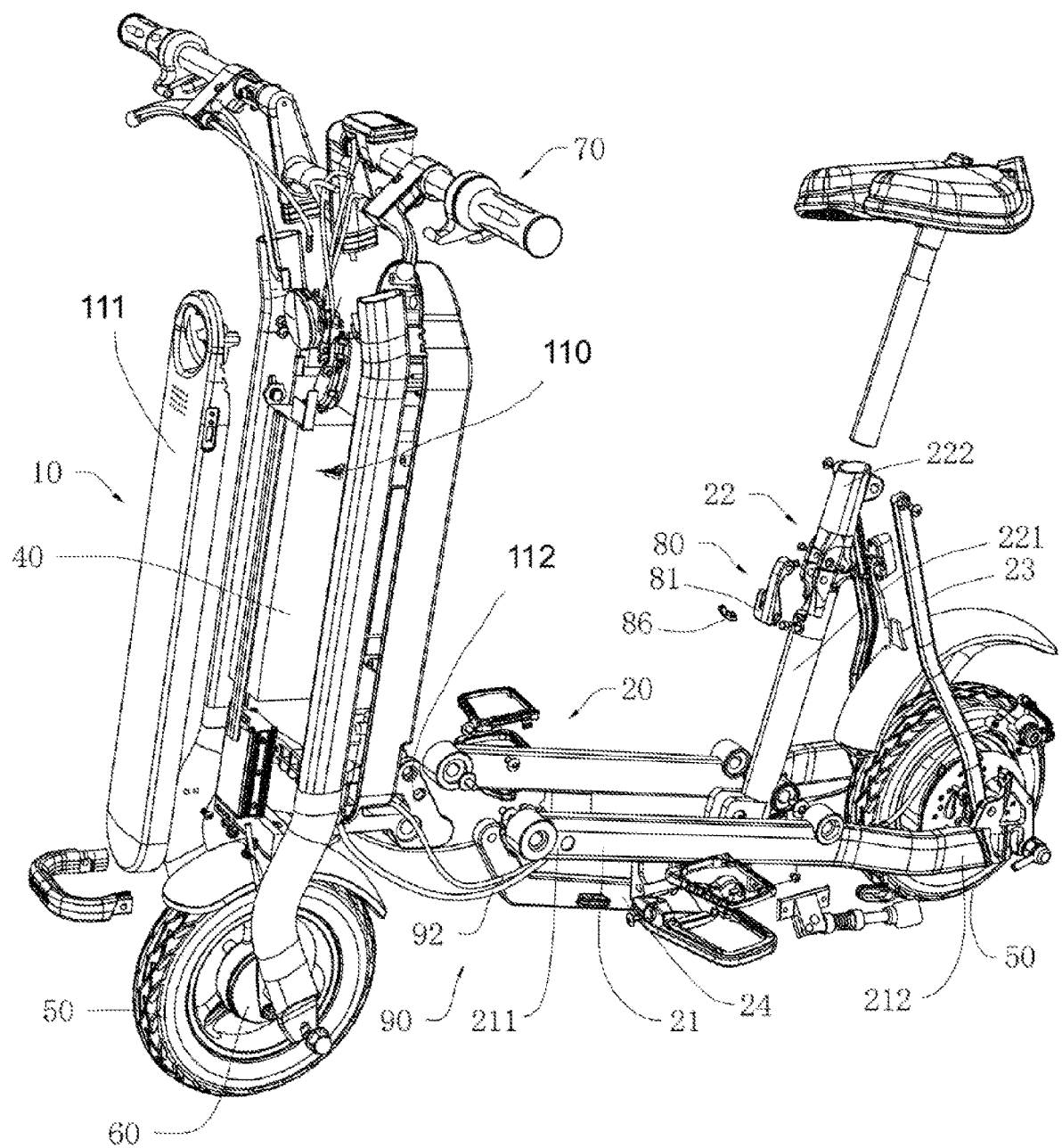
FIG. 3 is an exploded perspective view of the collapsible electric vehicle according to the preferred embodiment of the present invention.

As shown in FIG. 1, the collapsible electric vehicle according to the preferred embodiment of the present invention is shown at an expanded state. At the expanded state, the first supporting frame 22 of the vehicle 20 is unfolded to support and maintain the seat 30 at an elevated and horizontal position, wherein the front vehicle member 10 is unfolded to pivotally move away from the vehicle frame 20, such that the collapsible electric vehicle is ready for being ridden and driven. As shown in FIG. 2, the collapsible electric vehicle according to the preferred embodiment of the present invention is shown at the collapsed state. At the collapsed state, the first supporting frame 22 of the vehicle frame 20 is folded and stored in the receiving channel 210 of the vehicle frame 20, wherein the front vehicle member 10 is folded on the first supporting frame 22 while the seat 30 is folded between the front vehicle member 10 and the first supporting frame 22. Correspondingly, the vehicle frame 20 is moved between an unfolded position and a folded position. At the unfolded position of the vehicle frame 20, the first supporting frame 22 of the vehicle frame 20 is extended and retained at an upright position from the main frame 21. At the folded position of the vehicle frame 20, the first supporting frame 22 is folded up to the main frame 21.

Figure 4:
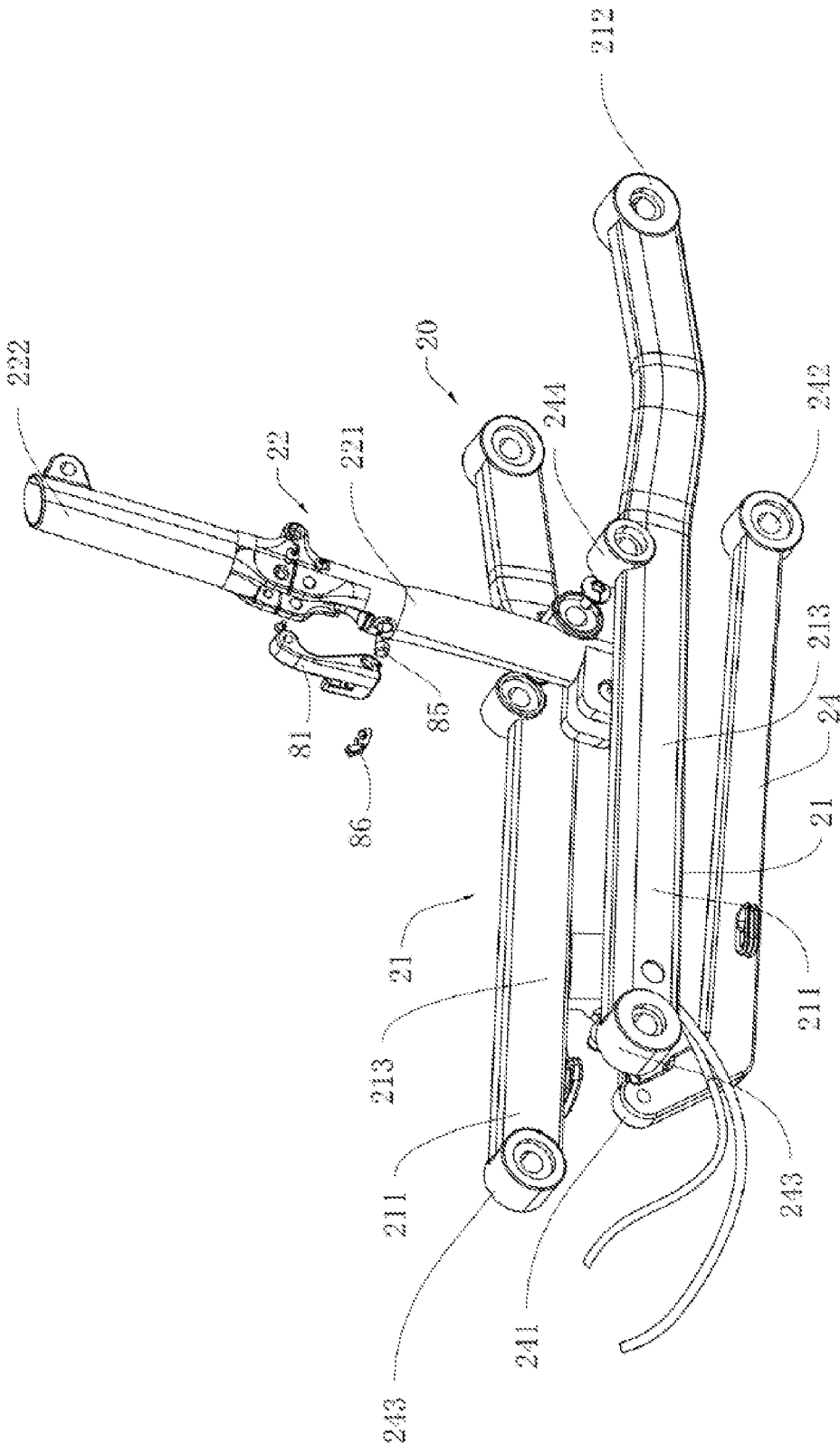
FIG. 4 is a perspective view of a vehicle frame of the collapsible electric vehicle according to the preferred embodiment of the present invention, illustrating a first supporting frame being vertically retained at a main frame.

As shown in FIGS. 1 and 4, the first supporting frame 22 of the vehicle frame 20 has a lower end portion 221 and an upper end portion 222 upwardly extended from the lower end portion 221, wherein the upper end portion 222 of the first supporting frame 22 is pivotally coupled to the lower end portion 221 thereof. As shown in FIGS. 1 to 5, the vehicle frame 20 further comprises a pivot joint 223, wherein the upper end portion 222 of the first supporting frame 22 is pivotally coupled to the lower end portion 221 thereof via the pivot joint 223. When the first supporting frame 22 of the vehicle frame 20 is folded, the upper end portion 222 of the first supporting frame 22 is pivotally folded at the lower end portion 221 thereof. Preferably, the pivot joint 223 of the vehicle frame 20 is located at a rear side of the first supporting frame 22, such that the upper end portion 222 of the first supporting frame 22 is pivotally and rearwardly folded at the lower end portion 221 thereof. Alternatively, the pivot joint 223 of the vehicle frame 20 is located at a front side of the first supporting frame 22, such that the upper end portion 222 of the first supporting frame 22 is pivotally and frontwardly folded at the lower end portion 221 thereof.

As shown in FIGS. 1 to 7, the collapsible electric vehicle according to the preferred embodiment further comprises a vehicle frame lock 80, wherein the vehicle frame lock 80 comprises a first positioning member 81 and a second positioning member 82. The first positioning member 81 is provided at the upper end portion 222 of the first supporting frame 22 while the second positioning member 82 is provided at the lower end portion 221 of the first supporting frame 22, wherein the first and second positioning members 81, 82 are aligned with each other when the upper end portion 222 and the lower end portions 221 of the first supporting frame 22 are coupled with each other. It should be understood that the first and second positioning members 81, 82 can be coupled with each other by different coupling configurations. For example, the first and second positioning members 81, 82 can be coupled via pin connecting configuration. Preferably, the vehicle frame lock 80 is provided at the first supporting frame 22 facing toward the front vehicle member 10.

As shown in FIGS. 1 to 10, the first positioning member 81 of the vehicle frame lock 80 has a pivot portion 811 pivotally coupled to the upper end portion 222 of the first supporting frame 22 and a limiting portion 812 extended from the pivot portion 811. The second positioning member 82 of the vehicle frame lock 80 is movably coupled at the lower end portion 221 of the first supporting frame 22 in a reciprocating manner, wherein the second positioning member 82 has a limiting end 821 arranged to engage with the limiting portion 812 of the first positioning member 81.

As shown in FIGS. 1 to 10, the first positioning member 81 of the vehicle frame lock 80 further has a driving face 8121 defined at the limiting portion 812. The second positioning member 81 further has a driven face 8211 defined at the limiting end 821, wherein the second positioning member 82 is configured to bias against the driving face 8121 of the limiting portion 812 of the first positioning member 81 to apply a predetermined pressing force thereat. When the driven face 8211 of the limiting end 821 is pressed, the limiting end 821 of the second positioning member 82 is driven to move at a direction away from the first positioning member 81. When the driving face 8121 is moved away from the driven face 8211 to release the pressing force, the limiting end 821 of the second positioning member 82 is configured to move at a direction toward the first positioning member via a restoring force. It should be understood that the first positioning member 81 further defines an engagement portion 810 is configured to be moved when the limiting end 821 of the second positioning member 82 is driven to move toward the first positioning member 81 by the limiting portion 812 of the first positioning member 81 and when the limiting end 821 of the second positioning member 82 is driven to subsequently move toward the first positioning member 81 via the restoring force, the limiting end 821 of the second positioning member 82 is able to engage at the engagement portion 810 of the first positioning member 81. Preferably, the engagement portion 810 is formed between the pivot portion 811 and the limiting portion 812 of the first positioning member 81. Preferably, the engagement portion 810 of the first positioning member 81 is embodied as an engaging hole or an engaging groove. It should be understood that the driving face 8121 of the limiting portion 812 of the first positioning member 81 and the driven face 8211 of the limiting end 821 of the second positioning member 82 can be inclined surfaces and can be matched to engage with each other.

As shown in FIGS. 1 to 10, the vehicle frame lock 80 further comprises a first restoring member 83 and a moving channel 84. The second positioning member 82 further has a driven end 822 positioned opposite to the limiting end 821, wherein the second positioning member 82 is movably disposed at the moving channel 85 in a reciprocating manner. The first restoring member 83 is set at the driven end 822 of the second positioning member 82. The first restoring member 83 is disposed in the moving channel 84 to drive the driven end 822 of the second positioning member 82 for moving the second positioning member 82 in a direction toward the first positioning member 81 so as to engage with the first positioning member 81. Preferably, one end of the first restoring member 83 is biased against the driven end 822 of the second positioning member 82 while an opposed end of the restoring member 83 is biased against the lower end portion 221 of the first supporting frame 22. In other words, the first restoring member 83 is disposed between the driven end 822 of the second positioning member 82 and the lower end portion 221 of the first supporting frame 22, wherein the first restoring member 83 is arranged to apply the restoring force to the driven end 822 of the second positioning member 82. Preferably, the first restoring member 83 is embodied as a compression spring.

As shown in FIGS. 1 to 10, the vehicle frame lock 80 further comprises a driving member 85 having a driving member end 851. The second positioning member 82 further has a driven portion 823, wherein the driving member end 851 of the driving member 85 is positioned facing toward the driven portion 823 of the second positioning member 82. When the driving member 85 is pressed by the user with a proper pressing force, the driving member end 851 of the driving member 85 is moved to the driven portion 823 of the second positioning member 82, so as to drive the limiting end 821 of the second positioning member 82 moving away the first positioning member 81. Preferably, the driven portion 823 of the second positioning member 82 is positioned between the limiting end 821 and the driven end 822 of the second positioning member 82. Preferably, the driving member 85 is disposed at a restoring channel 850 which is communicatively linked to the moving channel 84. It is worth mentioning that when the user releases the pressing force at the driven portion 823 of the second positioning member 82, the second positioning member 82 is moved by the restoring force from the first restoring member 83, such that the second positioning member 82 is driven to move along the moving channel 84 in a direction toward the first positioning member 81.

As shown in FIGS. 1 to 10, when the collapsible electric vehicle is moved or actuated at the expanded state (i.e. the first supporting frame 22 of the vehicle frame 20 is moved at the unfolded position), the limiting portion 812 of the first positioning member and the limiting end 821 of the second positioning member 82 are engaged with each other. When the user needs to fold up the first supporting frame 22, the user is able to initially press against the driving member 85 of the vehicle frame lock 80 in order to drive the second positioning element 82 moving along the moving channel 84 in a direction away from the first positioning member 81 so as to disengage the limiting end 821 of the second positioning member 82 with the limiting portion 812 of the first positioning member 81, such that the first supporting frame 22 can be folded by the user. When the collapsible electric vehicle is moved or actuated at the collapsed state (i.e. the first supporting frame 22 of the vehicle frame 20 is moved at the folded position), the limiting end 821 of the second positioning member 82 is disengaged with the limiting portion 812 of the first positioning member 81. When the front vehicle member 10 is lifted by the user, the front vehicle member 10 is arranged to pivotally move the main frame 21 through a driving arm 24 corresponding to the lower end 221 of the first supporting frame 22, so as to unfold the first supporting frame 22. When the lower end portion 221 and the upper end portion 222 of the first supporting frame 22 are connected (or aligned) with each other, the user is able to pivotally move the limiting portion 812 of the first positioning member 81, and the limiting portion 812 of the first positioning member 81 is arranged to drive the limiting end 821 of the second positioning member 82 along the moving channel 84 to move away from the first positioning member 81 until the engagement portion 810 of the limiting portion 812 of the first positioning member 81 and the limiting end 821 of the second positioning member 82 are aligned with each other. At this time, under the restoring force of the first restoring member 83, the limiting end 821 of the second positioning member 82 is driven to move toward the first positioning member 81 so as to engage with the engagement portion 810 for retaining the first supporting frame 22 at the folded position.

As shown in FIGS. 1 to 10, the vehicle frame lock 80 further comprises a first engaging member 86 and a second engaging member 87, wherein the first engaging member 86 is provided at the first positioning member 81 while the second engaging member 87 is provided at the lower end portion 221 of the first supporting frame 22. Accordingly, the first and second engaging members 86, 87 are engaged with each other when the first supporting frame 22 is moved at the unfolded position. Furthermore, the first and second engaging members 86, 87 are disengaged with each other when the first supporting frame 22 is moved at the folded position. Preferably, the first engaging member 86 is pivotally coupled at the first positioning member 81. It is worth mentioning that the first and second engaging members 86, 87 can be engaged with each other via different engaging configurations. For example, the first and second engaging members 86, 87 can be engaged with each other via pin connecting configuration, bolt connecting configuration or the like.

As shown in FIGS. 1 to 10, when the collapsible electric vehicle is moved or actuated at the expanded state (i.e. the first supporting frame 22 of the vehicle frame 20 is moved at the unfolded position), the first and second engaging members 86, 87 of the vehicle frame lock 80 are engaged with each other. When the user needs to fold the first supporting frame 22, through the pivotally moving the first engaging member 86, the first engaging member 86 is moved away from the second engaging member 87 to disengage with the second engaging member 87, such that the user is able to fold the first supporting frame 22. When the collapsible electric vehicle is moved or actuated at the collapsed state (i.e. the first supporting frame 22 of the vehicle frame 20 is moved at the folded position), the first and second engaging members 86, 87 of the vehicle frame lock 80 are disengaged with each other. When the front vehicle member 10 is lifted by the user, the front vehicle member 10 is arranged to pivotally move the main frame 21 through the driving arm 24 corresponding to the lower end 221 of the first supporting frame 22 so as to unfold the first supporting frame 22. When the lower end portion 221 and the upper end portion 222 of the first supporting frame 22 are connected (or aligned) with each other, the user is able to pivotally move the limiting portion 812 of the first positioning member 81, and to pivotally move the first engaging member 86 to engage with the second engaging member 87, so as to retain the first supporting frame 22 at the folded position.

As shown in FIGS. 7 to 10, the vehicle frame lock 80 of the collapsible electric vehicle of the present invention further has an operating chamber 800 formed at the lower end portion 221 of the first supporting frame 22, wherein the operating chamber 800 has an inner chamber wall 801 and an operating opening 802. The second engaging member 87 is disposed at the inner chamber wall 801 of the operating chamber 800. As shown in FIGS. 7 to 10, the first engaging member 86 has a first engaging end 861 while the second engaging member 87 has a second engaging end 871, wherein each of the first and second engaging ends 861, 871 is formed in a hoop shape. When the first and second engaging members 86, 87 are engaged with each other, the first engaging end 861 of the first engaging member 86 is engaged with the second engaging end 871 of the second engaging member 87. In other words, the first engaging member 86 further has a first engaging groove 860 formed at an inner side of the first engaging end 861. The second engaging member 87 further has a second engaging groove 870 formed at an inner side of the second engaging end 871. The first engaging end 861 is engaged with the second engaging groove 871 while the second engaging end 871 is engaged with the first engaging groove 861. As shown in FIGS. 7 to 10, the first engaging member 86 further has a first engaging member pivot end 862 extended from the first engaging end 861, wherein the first engaging member pivot end 862 is pivotally coupled at the pivot portion 811 of the first positioning member 81.

As shown in FIGS. 5 to 10, according to the present invention, the operating chamber 800 of the vehicle frame lock 80 further has an observation opening 803 aligned with and facing toward the second engaging member 87, such that when the first supporting frame 22 is moved at the unfolded position, the user is able to see and determine whether the first and second engaging members 86, 87 are engaged with each other or not through the observation opening 803.

As shown in FIGS. 7 to 10, according to the present invention, the vehicle frame lock 80 further comprises a second restoring member 88 disposed between the first engaging member pivot end 862 of the first engaging member 86 and the second engaging member 87 for applying an outward pushing force toward the first engaging member 86, such that when the first and second engaging members 86, 87 are engaged with each other, the outward pushing force of the second restoring member 88 is applied to the first engaging member 86 to retain the first and second engaging members 86, 87 being engaged with each other. Preferably, the second restoring member 88 has one end biased against a lower edge 8621 of the first engaging member pivot end 862 and an opposed end biased against an upper edge 871 of the second engaging member 87. Preferably, the second restoring member 88 is embodied as a compression spring.

As shown in FIGS. 7 to 10, according to the present invention, the vehicle frame lock 80 further comprises a pivot linkage 89 having one end pivotally coupled at the inner side of the pivot portion 811 of the first positioning member 81 and an opposed end pivotally coupled at the lower end portion 221 of the first supporting frame 22 for ensuring whether the first supporting frame 22 being folded or unfolded, the first supporting frame 22 is synchronized to engage or disengage with the second positioning member 82.

Figure 5:
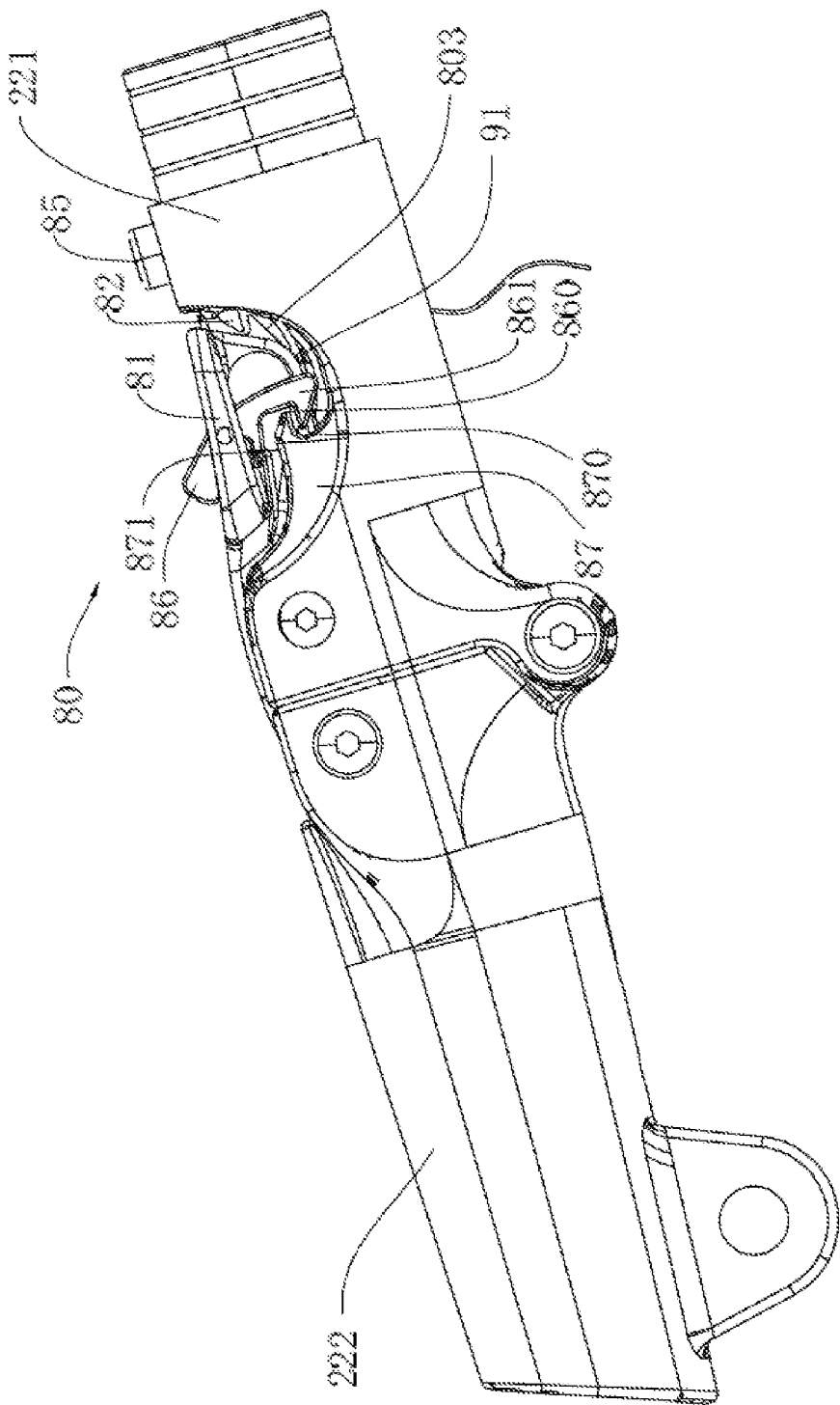
FIG. 5 is a partially enlarged side view of the first supporting frame of the vehicle frame of the collapsible electric vehicle according to the preferred embodiment of the present invention.
Figure 6:
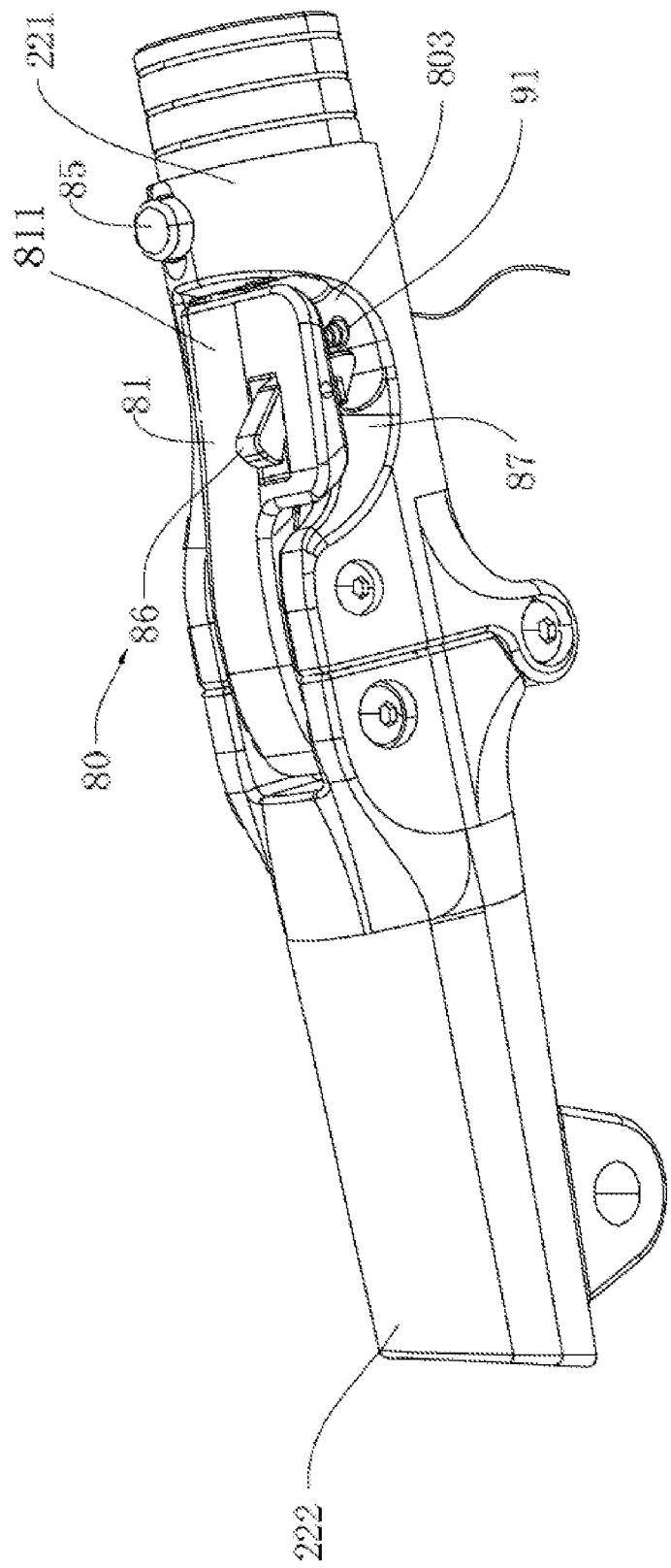
FIG. 6 is a partially enlarged perspective view of the first supporting frame of the vehicle frame of the collapsible electric vehicle according to the preferred embodiment of the present invention.
Figure 7:
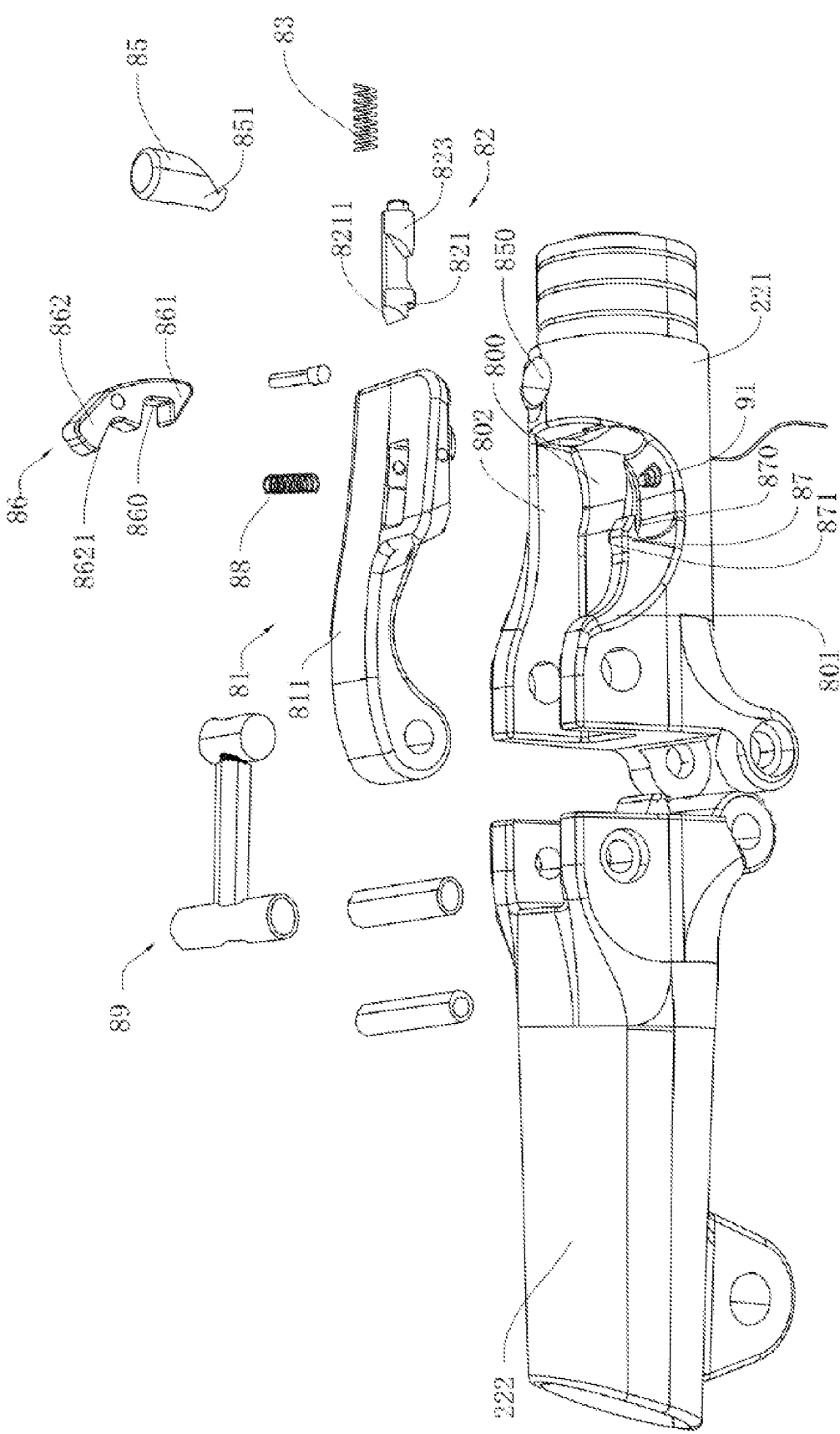
FIG. 7 is an exploded perspective view of the first supporting frame of the vehicle frame of the collapsible electric vehicle according to the preferred embodiment of the present invention.
Figure 8:
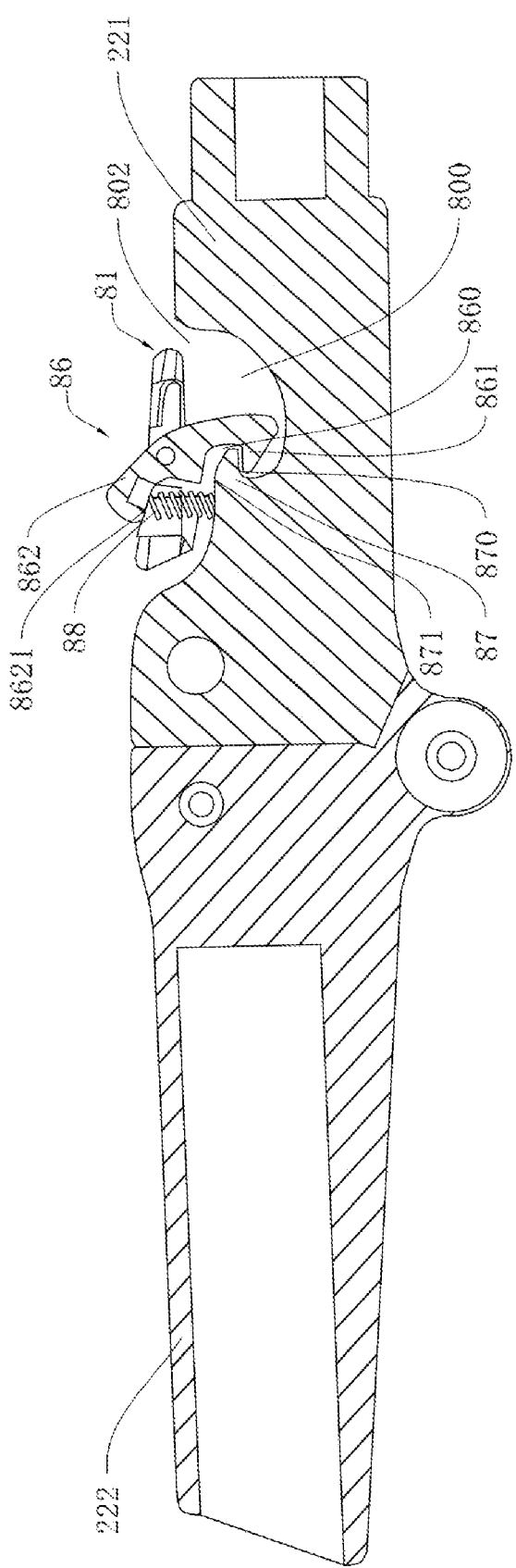
FIG. 8 is a sectional view of the first supporting frame of the vehicle frame of the collapsible electric vehicle at the expanded state according to the preferred embodiment of the present invention.
Figure 9:
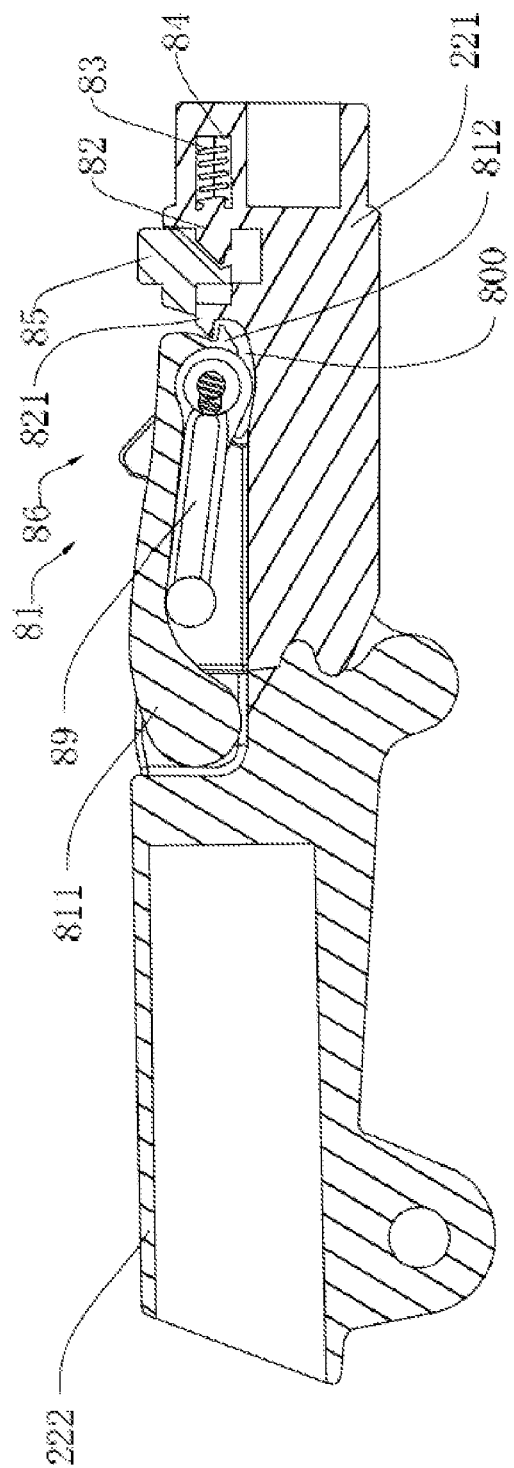
FIG. 9 is a sectional view of the first supporting frame of the vehicle frame of the collapsible electric vehicle at the collapsed state according to the preferred embodiment of the present invention.

As shown in FIGS. 7 to 10 and 12, the collapsible electric vehicle of the present invention further comprises a power control system 90 which comprises a power switch 91 and a power circuit 92. The power switch 91 is disposed at the inner chamber wall 801 of the operating chamber 800 of the vehicle frame lock 80, wherein when the first supporting frame 22 is unfolded, the power switch 91 is pressed by the first positioning member 81 to control the power circuit 92 for being electrically connected, and when the first supporting frame 22 is folded, the power circuit 92 is controlled for being electrically disconnected. In other words, the power switch 91 is configured to be pressed by the first positioning member 81 when the first positioning member 81 is pivotally moved to the lower end portion 221 of the first supporting frame 22. When the first positioning member 81 is pivotally move away from the lower end portion 221 of the first supporting frame 22, the power switch 91 will not be pressed, that is released, by the first positioning member 81. It is appreciated that, through the power circuit 92 of the power control system 90, the electrical power of the power supply 40 is arranged to supply to the driving mechanism 60 of the collapsible electric vehicle of the present invention. The driving mechanism 60 of the present invention is embodied as an electric driving motor. In other words, the power circuit 92 is configured to control the electrical power of the power source 40 supplying to the electric drive motor 60. Therefore, the power switch 91 of the power control system 90 is switched on only when the user correctly locks the vehicle frame lock 80, such that the first supporting frame 22 is securely retained at its unfolded position. Then, the power switch 91 of the power control system 90 is switched on in a connected state to control the power circuit 92 for supplying the electrical power to the driving mechanism 60 of the collapsible electric vehicle. When the first supporting frame 22 is folded or when the vehicle frame lock 80 is improperly locked, the power switch 91 of the power control system 90 is released and switched off, such that the power circuit 92 is disconnected to the collapsible electric vehicle and the driving mechanism 60 is terminated. Preferably, as shown in FIGS. 5 to 7, when the first positioning member 81 is pivotally moved to the lower end portion 221 of the first supporting frame 22, the first positioning member 81 is configured to press on the power switch 91 via a control portion 813 of the first positioning member 81. Preferably, the control portion 813 of the first positioning member 81 is extended from the pivot portion 811 thereof. It should be appreciated that the controlling method of the power supply to the driving mechanism 60 can be achieved by different configurations to ensure the safety driving features of the collapsible electric vehicle of the present invention.

It is worth mentioning that, as shown in FIGS. 5 to 10, the first positioning member 81 of the vehicle frame lock 80 of the collapsible electric vehicle of the present invention is configured to have a planar configuration, wherein when the first positioning member 81 is pivotally moved to the lower end portion 221 of the first supporting frame 22, the first positioning member 81 is configured to cover the operating opening 802 of the operating chamber 800 of the vehicle frame lock 80.

Figure 10:
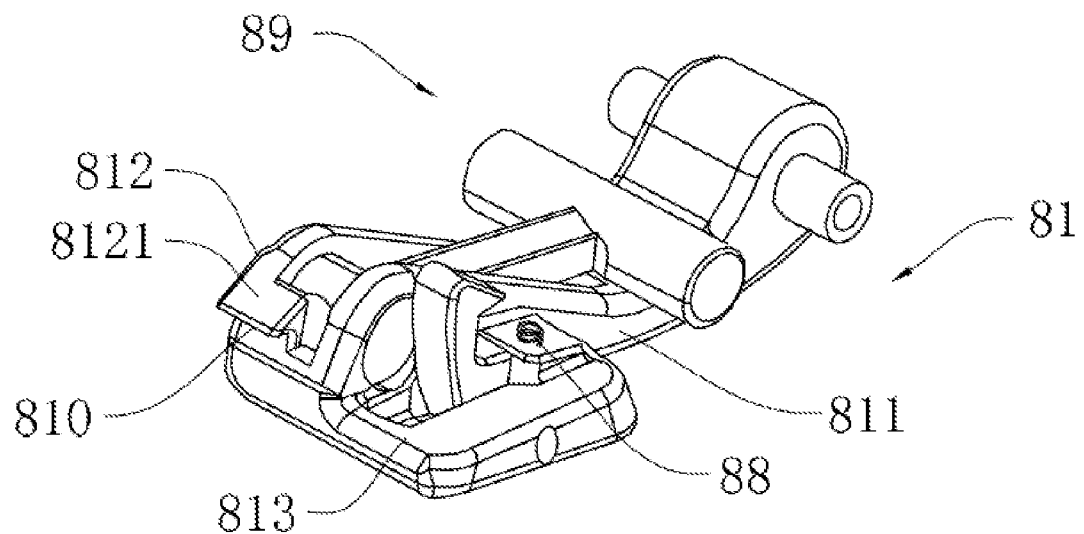
FIG. 10 is a perspective view of a pivot joint and a vehicle frame lock of the first positioning unit of the vehicle frame of the collapsible electric vehicle according to the preferred embodiment of the present invention.

FIG. 10 illustrates an alternative mode of the power control system 60 of the collapsible electric vehicle of the present invention, wherein the power control system 90A comprises a power controller 91A arranged in such a manner that when the power controller 91A receives an unfolded signal, the electric power of the power source of the collapsible electric vehicle is controlled according to a driving instruction being supplied to the driving mechanism 60 of the collapsible electric vehicle. When the unfolded signal is not received, the electric power of the power source of the collapsible electric vehicle is blocked to supply to the driving mechanism 60 of the collapsible electric vehicle.

As shown in FIGS. 1 to 10, the vehicle frame 20 of the collapsible electric vehicle further comprises a second supporting frame 23, wherein the main frame 21 has a main frame front end 211 and a main frame rear end 212. The second supporting frame 23 has one end pivotally coupled at the upper end portion 222 of the first supporting frame 22 and another end pivotally coupled at the main frame rear end 212 of the main frame 21, such that when the first supporting frame 22 of the vehicle frame 20 is unfolded, the first supporting frame 22, the main frame 21, and the second supporting frame 23 of the vehicle frame 20 form a triangular structure, so as to provide a stable and rigid support for the seat 30 (or the rider or user to sit on the seat 30). Preferably, when the first supporting frame 22 of the vehicle frame 20 is unfolded, an angle between the first supporting frame 22 and the main frame rear end 212 of the main frame 21 is an acute angle, an angle between the second supporting frame 23 and the main frame rear end 212 of the main frame 21 is an acute angle, and an angle between the second supporting frame 23 and the first supporting frame 22 is an acute angle. It is worth mentioning that during the folding operation of the first supporting frame 22 of the vehicle frame 20, the first supporting frame 22 is folded by itself, such that the upper end portion 222 of the first supporting frame 22 is folded to the lower end portion 221 thereof. After the first supporting frame 22 is folded itself, the folded first supporting frame 22 is further folded in the receiving channel 210 of the vehicle frame 20. It should be appreciated that the second supporting frame 23 can be formed in any shape in the present invention. For example, the second supporting frame 23 can be formed in rod shape, elongated shape, or bar shape.

As shown in FIGS. 1 to 10, the second supporting frame 23 has one end coupled at the upper end portion 222 of the first supporting frame 22 and another end disposed at the receiving channel 210, such that when the first supporting frame 22 is folded and stored in the receiving channel 210 of the vehicle frame 20, the second supporting frame 23 is folded between the upper end portion 222 and the lower end portion 221 of the first supporting frame 22.

As shown in FIGS. 1 to 10, the vehicle frame 20 of the collapsible electric vehicle further comprises the driving arm 24, wherein two ends of the driving arm 24 are pivotally coupled to the front vehicle member 10 and the lower end portion 221 of the first supporting frame 22 of the vehicle frame 20 respectively. As shown in FIGS. 1 to 5, the driving arm 24 has a first arm pivot portion 241 defined at one end to pivotally couple at the front vehicle member 10, and a second arm pivot portion 242 defined at another end to pivotally couple at the lower end portion 221 of the first supporting frame 22. Preferably, the first arm pivot portion 241 is located higher than the second arm pivot portion 242, such that when the first supporting frame 22 of the vehicle frame 20 is folded itself and to the vehicle frame 20, the front vehicle member 10 is driven to fold by the first supporting frame 22 via the driving arm 24. When the front vehicle member 10 is driven to fold toward the vehicle frame 20, the first supporting frame 22 is driven to fold itself and to fold toward the vehicle frame 20 via the driving arm 24.

As shown in FIGS. 1 to 10, the vehicle frame 20 of the collapsible electric vehicle further has a third arm pivot portion 243 provided at a front end of the main frame 21 to pivotally couple at the front vehicle member 10, and a fourth arm pivot portion 244 provided at the main frame 21 to pivotally couple at the first supporting frame 22. When the collapsible electric vehicle is moved at the expanded state, the first arm pivot portion 241 is located higher than the third arm pivot portion 243 while the fourth arm pivot portion 244 is located higher than the second arm pivot portion 242. It is worth mentioning that the first arm pivot portion 241, the second arm pivot portion 242, the third arm pivot portion 243, and the fourth arm pivot portion 244 are all arranged in a horizontal manner. As shown in FIGS. 1 and 2, the front vehicle member 10 of the collapsible electric vehicle further comprises a front vehicle body 11 and a connecting member 12 extended from the front vehicle body 11 to couple at the main frame 21 of the vehicle frame 20. Accordingly, the connecting member 12 has one end extended from the front vehicle body 11 and another end coupled at the main frame 21 of the vehicle frame 20 via the third arm pivot portion 243. Accordingly, a length between the third arm pivot portion 243 and the front vehicle body 11 is set as L1 while a length between the fourth arm pivot portion 244 and the second arm pivot portion 242 is set as L2, wherein L1 is greater than L2.

As shown in FIGS. 1 to 10, the main frame 21 of the vehicle frame 20 of the collapsible electric vehicle further comprises two frame bodies 213 spaced apart with each other to define the receiving channel 210 therebetween. It is worth mentioning that the main frame 21 is mainly constructed by the two frame bodies 213 with the receiving channel 210 therebetween, wherein each of the frame bodies 213 has an elongated planar configuration to maximize a width of the receiving channel 210 and to minimize the weight of the vehicle frame 20. In other words, the structural configuration of the frame bodies 213 with the receiving channel 210 is to reduce the weight of the vehicle frame 20 and to enhance the strength of the vehicle frame 20 as much as possible. It is appreciated that the vehicle frame 20 can be made of high-strength and low-density materials, such as carbon fiber, and high-strength alloys (such as aluminum-magnesium alloys). In addition, the frame body 213 of the vehicle frame 20 can form in any shape that can achieve the purpose of the present invention according to the purpose of the present invention, wherein the shape of the frame body 213 can be regular or irregular.

As shown in FIGS. 1 to 10, the shape and length of the second supporting frame 23 of the vehicle frame 20 of the collapsible electric vehicle are configured according to the shape and length of the receiving channel 210, such that the second supporting frame 23 can be fittingly received in the receiving channel 210. Preferably, one end of the second supporting frame 23 of the vehicle frame 20 is set at the upper end portion 222 of the first supporting frame 22 of the vehicle frame 20, wherein another end of the second supporting frame 23 is set at an inner side of the frame body 213 of the main frame 21 of the vehicle frame 20. In other words, two second supporting frames 23 are provided, wherein the upper end portion 222 of the first supporting frame 22 is coupled between two upper ends of the second supporting frames 23 while two lower ends of the second supporting frames 23 are coupled at inner sides of the frame bodies 213 respectively.

As shown in FIGS. 1 to 10, the connecting member 12 of the front vehicle member 10 of the collapsible electric vehicle has one end pivotally coupled to the main frame front end 211 of the main frame 21 and another end pivotally coupled to the front vehicle body 11, wherein the front vehicle body 11 is configured for being pivotally moved in a horizontal direction corresponding to the connecting member 12, such that the front vehicle member 10 is able to pivotally move in a horizontal direction corresponding to the connecting member 12. Therefore, the collapsible electric vehicle of the present invention is able to adjust the direction according to the driving situation during the driving operation. Preferably, the main frame front end 211 of the main frame 21 of the vehicle 20 is coupled between the two frame bodies 213, such that the connecting member 12 is able to pivotally move in a vertical direction corresponding to the frame bodies 213. In other words, the front vehicle body 11 of the front vehicle member 10 of the collapsible electric vehicle is pivotally coupled at the connecting member 12 in an upright manner, such that the front vehicle body 11 of the front vehicle member 10 can be pivotally moved in a horizontal direction corresponding to the connecting member 12, as shown in FIGS. 1 and 2.

As shown in FIGS. 1 to 10, the front vehicle body 11 of the front vehicle member 10 of the collapsible electric vehicle comprises a front body housing 111 having a housing cavity 110, wherein the power supply 40 and the driving mechanism 60 are received in the housing cavity 110. Accordingly, the driving mechanism 60 is operatively connected to one of the wheels 50 to drive the wheel 50 to rotate so as to propel the collapsible electric vehicle. It is appreciated that the driving mechanism 60 can be any driving device electrically connected to the power supply 40, such that the driving mechanism 60 is powered by the electrical energy of the power supply 40 to drive at least one of the wheels 50 to rotate, so as to drive the collapsible electric vehicle. Preferably, the driving mechanism 60 is embodied as a driving motor for driving the wheel 50 of the collapsible electric vehicle to rotate. Preferably, the driving mechanism 60 is embodied as a built-in wheel driving motor that can be directly coupled at the wheel 50 of the collapsible electric vehicle.

As shown in FIGS. 1 to 10, the vehicle frame 20 of the collapsible electric vehicle is embodied as a foldable frame which is constructed to have the main frame 21, the first supporting frame 22 and the second supporting frame 23. The lower end portion 221 of the first supporting frame 22 is pivotally coupled at the main frame 21 while the upper end portion 222 of the first supporting frame 22 is pivotally coupled at the lower end portion 221 thereof. One end of the second supporting frame 23 is pivotally coupled at the upper end portion 222 of the first supporting frame 22 while another end of the second supporting frame 23 is pivotally coupled at the main frame rear end 212 of the main frame 21. One end of the driving arm 24 is pivotally coupled to the lower end portion 221 of the first supporting frame 22 while another end of the driving arm 24 is pivotally coupled at the front vehicle member 10. When the vehicle frame 20 is moved at the folded position, the lower end portion 221 of the first supporting frame 22 is pivotally folded on the main frame 21, the upper end portion 222 of the first supporting frame 22 and the second supporting frame 23 are pivotally folded at the lower end portion 221 of the first supporting frame 22. When the vehicle frame 20 is moved at the unfolded position, the first supporting frame 22 is unfolded and retained in an upright manner from the main frame 21. Preferably, when the vehicle frame 20 is moved at the unfolded position, the first supporting frame 22, the second supporting frame 23 and the main frame 21 form an acute triangular configuration. It is appreciated that the vehicle frame lock 80 of the collapsible electric vehicle of the present invention can be integrated as a part of the vehicle frame 20.

As shown in FIGS. 4 to 10, the vehicle frame lock 80 of the collapsible electric vehicle is constructed to have the first positioning member 81 and the second positioning member 82, wherein the first positioning member 81 is coupled at the upper end portion 222 of the first supporting frame 22 while the second positioning member 82 is coupled at the lower end portion 221 of the first supporting frame 22. Accordingly, the first and second positioning members 81, 82 are engaged with each other when the first supporting frame 22 is unfolded and are disengaged with each other when the first supporting frame 22 is folded. It is appreciated that the first and second positioning members 81, 82 are engaged with each other via different engaging configurations. For example, the first and second positioning members 81, 82 are engaged with each other via pin connecting configuration, bolt connecting configuration or the like.

As shown in FIGS. 4 to 10, the vehicle frame lock 80 of the collapsible electric vehicle is further constructed to have the first engaging member 86 and the second engaging member 87, wherein the first engaging member 86 is coupled at the first positioning member 81 while the second engaging member 87 is coupled at the lower end portion 221 of the first supporting frame 22. The first and second engaging members 86, 87 are engaged with each other when the first supporting frame 22 is unfolded and are disengaged with each other when the first supporting frame 22 is folded. Preferably, the first engaging member 86 is pivotally coupled at the first positioning member 81. It is appreciated that the first and second engaging members 86, 87 are engaged with each other via different engaging configurations. For example, the first and second engaging members 86, 87 are engaged with each other via pin connecting configuration, bolt connecting configuration or the like.

Figure 11:
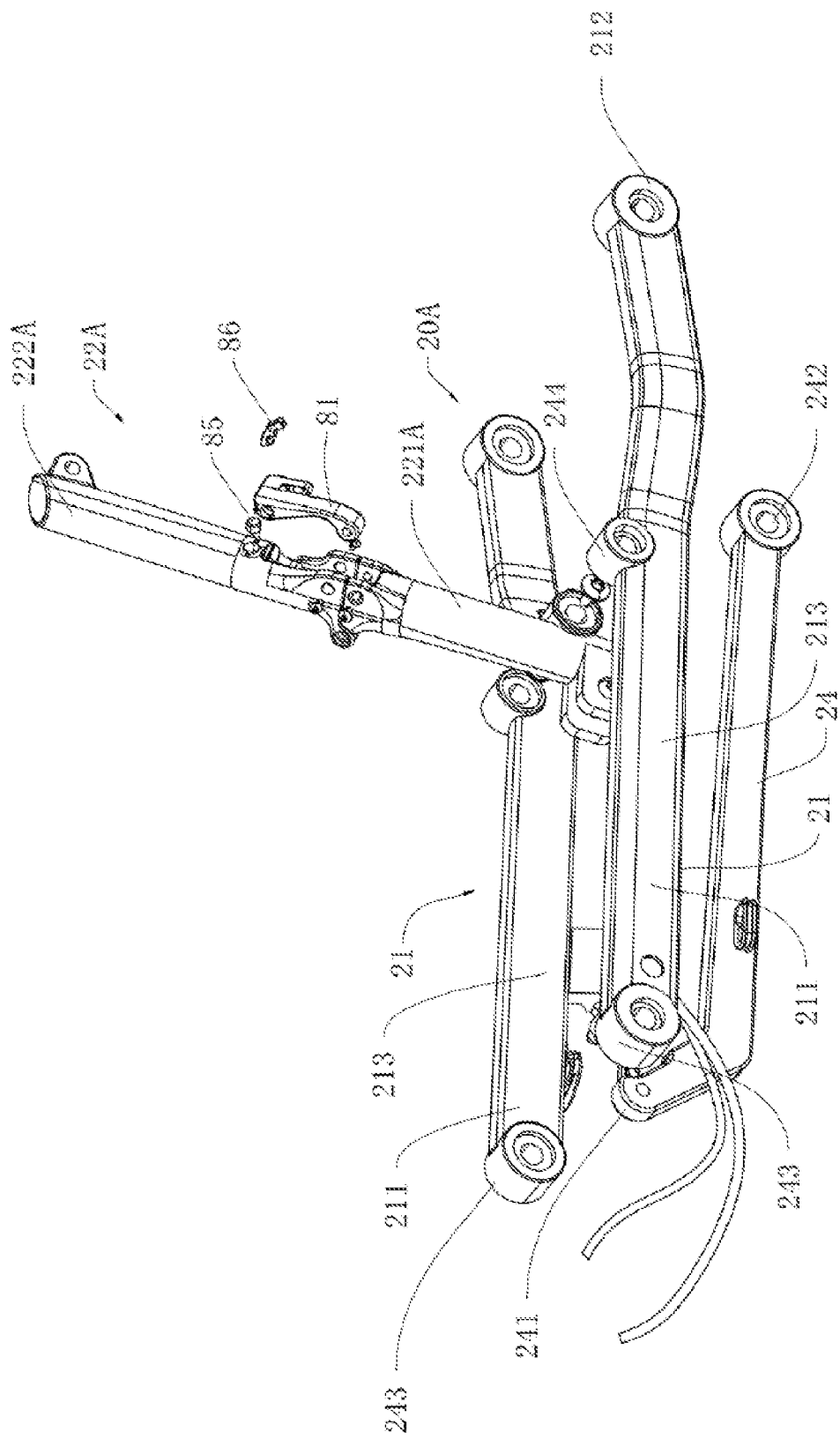
FIG. 11 illustrates an alternative mode of the vehicle frame of the collapsible electric vehicle according to the preferred embodiment of the present invention.
Figure 12:
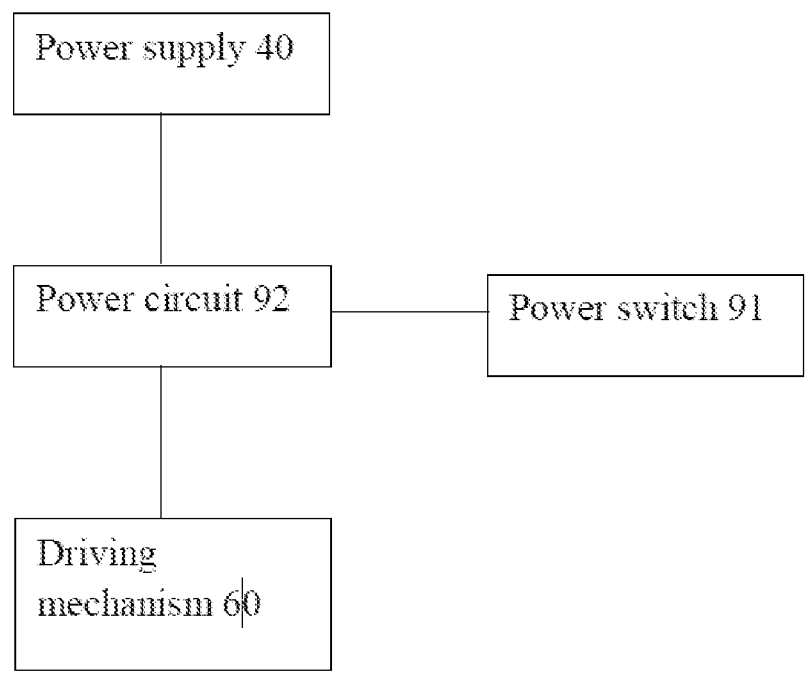
FIG. 12 is a block diagram illustrating a power controlling system of the collapsible electric vehicle according to the preferred embodiment of the present invention.

FIG. 11 illustrates an alternative mode of the vehicle frame 20 of the collapsible electric vehicle of the present invention, wherein the vehicle frame 20A is constructed to have the first supporting frame 22A, the second supporting frame 23 and the driving arm 24. The first supporting frame 22A has the lower end portion 221A and the upper end portion 222A pivotally coupled at the lower end portion 221A. In other words, the lower end portion 221A and the upper end portion 222A of the first supporting frame 22A are pivotally coupled with each other, wherein the upper end portion 222A of the first supporting frame 22A is pivotally coupled at an inner side of the lower end portion 221A thereof. Correspondingly, the vehicle frame lock 80 is provided at a side surface of the first supporting frame 22A to face toward the second supporting frame 23.

Figure 13:
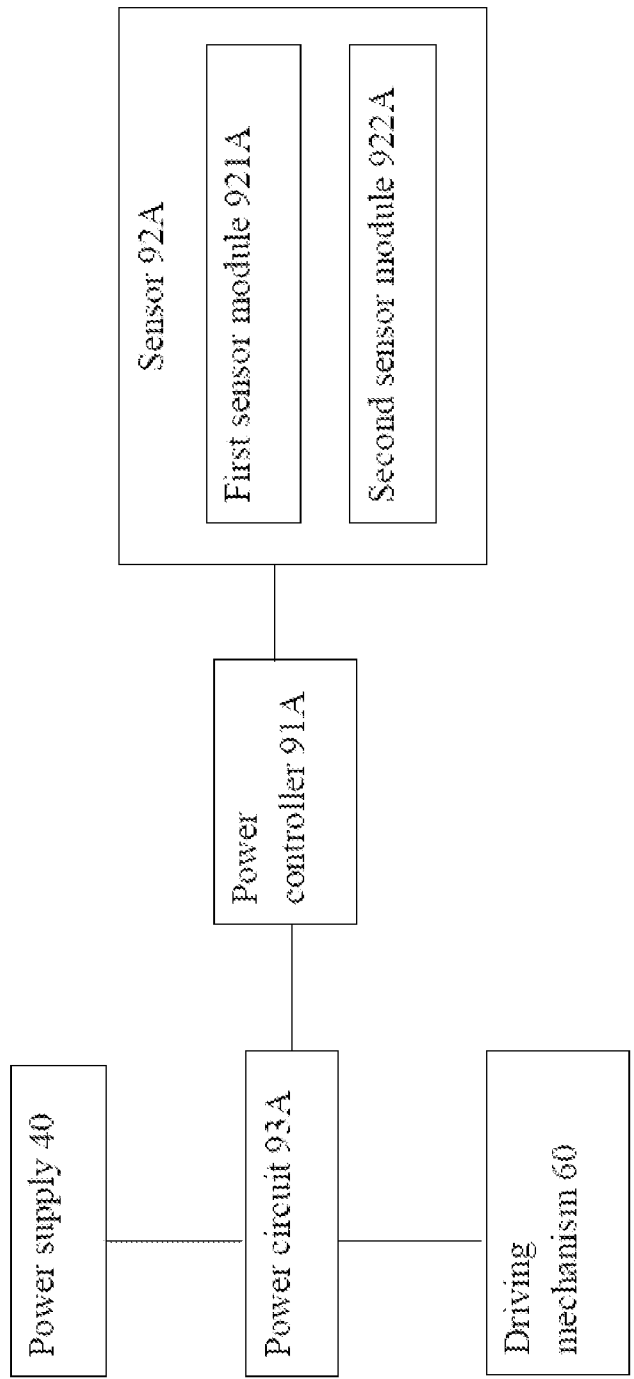
FIG. 13 illustrates an alternative mode of the power controlling system of the collapsible electric vehicle according to the preferred embodiment of the present invention.

FIG. 13 illustrates an alternative mode of the power control system 90 of the collapsible electric vehicle of the present invention, wherein the power control system 90A is constructed to have a power controller 91A, a sensor 92A, and a power circuit 93A. The power controller 91A and the power circuit 93A are electrically connected with each other, wherein the sensor 92A is configured to control the power circuit 93A to supply the electrical power to the driving mechanism 60 of the collapsible electric vehicle. The sensor 92A comprises a first sensor module 921A and a second sensor module 922A, wherein when the first and second sensor modules 921A, 922A, such as two terminals, are contacted with each other, the sensor 92A is activated to generate an unfolding signal. The unfolding signal is sent to the power controller 91A. Preferably, the first sensor module 921A and the second sensor module 922A of the sensor 92A are provided at the upper end portion 222 and the lower end portion 221 of the first supporting frame 22 respectively. When the first supporting frame 22 is unfolded, the upper end portion 222 and the lower end portion 221 of the first supporting frame 22 are securely locked up with each other, such that the first sensor module 921A of the sensor 92A is contacted with the second sensor module 922A thereof. Preferably, the unfolding signal generated by the sensor 92A is transmitted to the power controller 91A of the collapsible electric vehicle through an electronic communication network, wherein when the power controller 91A receives the unfolding signal, the power controller 91A is configured to allow the electrical power of the power supply of the collapsible electric vehicle to be supplied to the driving mechanism 60 thereof according to the driving instruction. Preferably, the power controller 91A is configured to prevent the electric power of the power supply of the collapsible electric vehicle to be supplied to the driving mechanism 60 thereof through the power circuit 93A when the unfolding signal is not received. Preferably, the first sensor module 921A and the second sensor module 922A of the sensor 92A are respectively provided at a first folding portion of the vehicle frame 20 (such as the upper end portion 222 of the first supporting frame 22) and a second folding portion of the vehicle frame 20 (such as the lower end portion 221 of the first supporting frame 22). The sensor 92A is arranged to generate the unfolding signal when the vehicle frame is unfolded, the first and second sensor modules 921A, 922A are contacted with each other.

Figure 14:
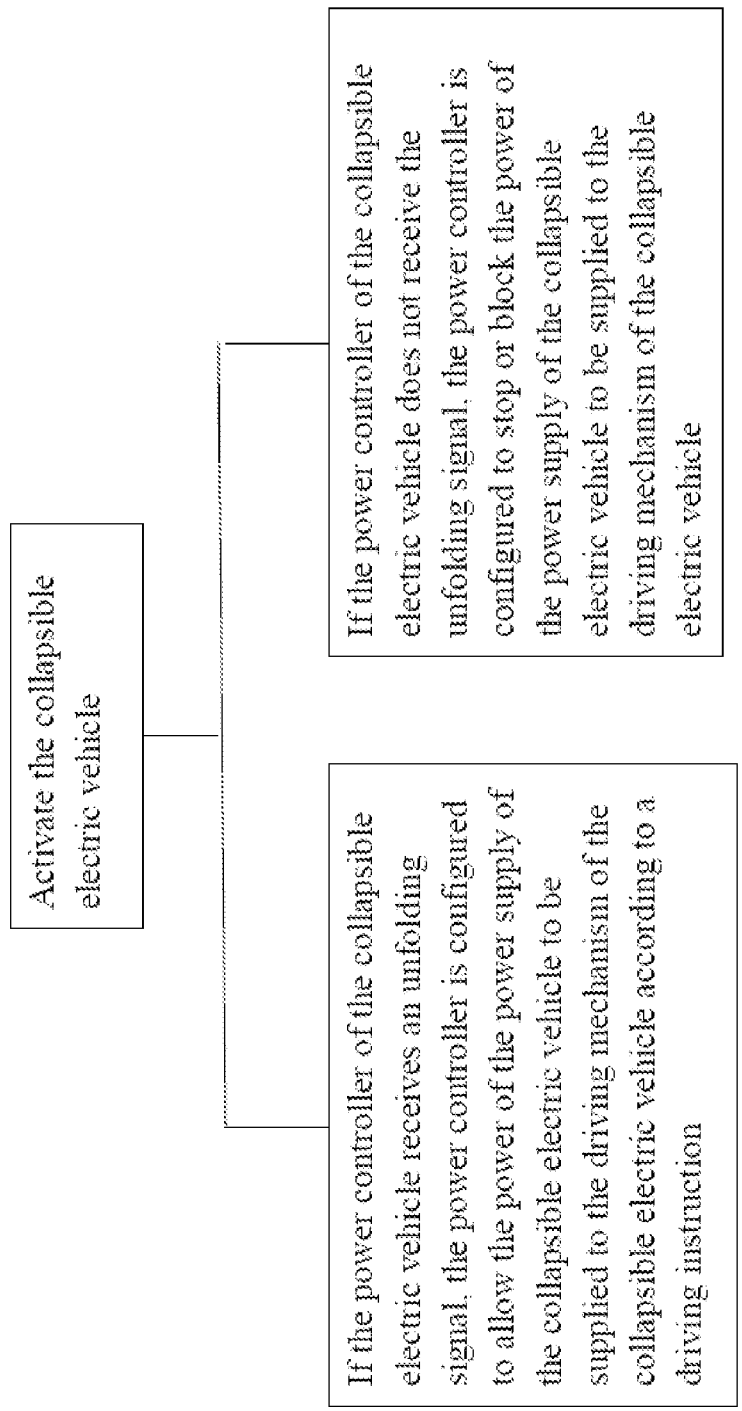
FIG. 14 is a block diagram illustrating the folding operation of the collapsible electric vehicle according to the preferred embodiment of the present invention.

As shown in FIG. 14, the present invention further provides a power control method for the collapsible electric vehicle, which comprises the following steps.

(A) Activate the collapsible electric vehicle, such as starting the collapsible electric vehicle.

(B) If the power controller of the collapsible electric vehicle receives an unfolding signal, the power controller is configured to allow the power of the power supply of the collapsible electric vehicle to be supplied to the driving mechanism of the collapsible electric vehicle according to a driving instruction. If the power controller of the collapsible electric vehicle does not receive the unfolding signal, the power controller is configured to stop or block the power of the power supply of the collapsible electric vehicle to be supplied to the driving mechanism of the collapsible electric vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A collapsible electric vehicle, comprising:
a front vehicle member;
a vehicle frame, wherein the front vehicle member is pivotally coupled to the vehicle frame;
a seat, wherein the seat is supported by the vehicle frame;
a power supply;
a plurality of wheels provided at the front vehicle member and the vehicle frame respectively; and
a driving mechanism, wherein the power supply is electrically connected to the driving mechanism for providing power to the driving mechanism, wherein the driving mechanism is operatively connected to at least one of the wheels for driving the at least one wheel, wherein the vehicle frame comprises a main frame and a first supporting frame, wherein the first supporting frame is coupled to the main frame to allow movement of the collapsible electric vehicle between an expanded state and a collapsed state, wherein when the collapsible electric vehicle is in the expanded state, the first supporting frame of the vehicle frame is unfolded and retained at an upright manner while the front vehicle member is unfolded to move away from the vehicle frame, wherein when the collapsible electric vehicle is in the collapsed state, the first supporting frame of the vehicle frame is folded on the main frame while the front vehicle member is folded on the first supporting frame, further comprising a vehicle frame lock which comprises a first positioning member and a second positioning member, wherein the first supporting frame has a lower end portion and an upper end portion, wherein the upper end portion of the first supporting frame is pivotally coupled at the lower end portion thereof, wherein the first supporting member of the vehicle frame lock is coupled at the upper end portion of the first supporting frame, wherein the second positioning member is coupled at the lower end portion of the second supporting frame, wherein the first and second positioning members are engaged with each other when the first supporting frame is unfolded and are disengaged with each other when the first supporting frame is folded, wherein the first positioning member of the vehicle frame lock has a pivot portion pivotally coupled at the upper end portion of the first supporting frame and a limiting portion extended from the pivot portion, wherein the second positioning member is movably coupled at the lower end portion of the first supporting frame in a reciprocating manner, wherein the second positioning member has a limiting end, wherein the limiting portion of the first positioning member and the limiting end of the second positioning member are arranged to be engaged with each other.

2. The collapsible electric vehicle, as recited in claim 1, wherein the first positioning member of the vehicle frame lock further has a driving face defined at the limiting portion, wherein the second positioning member further has a driven face defined at the limiting end, wherein the second positioning member is configured to bias against the driving face of the limiting portion of the first positioning member to apply a predetermined pressing force thereof, wherein when the driven face of the limiting end is pressed, the limiting end of the second positioning member is driven to move at a direction away from the first positioning member, and when the driving face is moved away from the driven face to release the pressing force, the limiting end of the second positioning member is configured to move at a direction toward the first positioning member via a restoring force.

3. The collapsible electric vehicle, as recited in claim 2, wherein the first positioning member further defines an engagement portion is configured to be moved when the limiting end of the second positioning member is driven to move toward the first positioning member by the limiting portion of the first positioning member and when the limiting end of the second positioning member is driven to subsequently move toward the first positioning member via the restoring force, the limiting end of the second positioning member is able to engage at the engagement portion of the first positioning member.

4. The collapsible electric vehicle, as recited in claim 3, wherein the engagement portion is an engaging groove formed between the pivot portion and the limiting portion of the positioning member.

5. The collapsible electric vehicle, as recited in claim 4, wherein the vehicle frame lock further comprises a first restoring member and a moving channel, wherein the second positioning member further has a driven end positioned opposite to the limiting end, wherein the moving channel of the vehicle frame lock is formed at the lower end portion of the first supporting frame, wherein the second positioning member is movably disposed at the moving channel in a reciprocating manner, wherein the first restoring member is set at the driven end of the second positioning member and the lower end portion of the first supporting frame, wherein the first restoring member is arranged for applying the restoring force to the driven end of the second positioning member so as to drive the driven end of the second positioning member for moving the second positioning member in a direction toward the first positioning member.

6. The collapsible electric vehicle, as recited in claim 5, wherein the vehicle frame lock further comprises a driving member having a driving member end, wherein the second positioning member further has a driven portion, wherein the driving member end of the driving member is positioned facing toward the driven portion of the second positioning member, wherein when the driving member is pressed, the driving member end of the driving member is moved to the driven portion of the second positioning member so as to drive the limiting end of the second positioning member moving away the first positioning member.

7. The collapsible electric vehicle, as recited in claim 1, wherein the vehicle frame lock comprises a first engaging member and a second engaging member, wherein the second engaging member is provided at the lower end portion of the first supporting frame, wherein the first and second engaging members are engaged with each other when the first supporting frame is unfolded, wherein the first and second engaging members are disengaged with each other when the first supporting frame is folded.

8. The collapsible electric vehicle, as recited in claim 7, wherein the first engaging member is provided at the first positioning member.

9. The collapsible electric vehicle, as recited in claim 8, wherein the vehicle frame lock further has an operating chamber formed at the lower end portion of the first supporting frame, wherein the operating chamber has an inner chamber wall and an operating opening, wherein the second engaging member is disposed at the inner chamber wall of the operating chamber.

10. The collapsible electric vehicle, as recited in claim 9, wherein the operating chamber further has an observation opening aligned with and facing toward the second engaging member.

11. The collapsible electric vehicle, as recited in claim 10, wherein the vehicle frame lock further comprises a second restoring member disposed between a first engaging member pivot end of the first engaging member and the second engaging member for applying an outward pushing force toward the first engaging member, such that when the first and second engaging members are engaged with each other, the outward pushing force of the second restoring member is applied to the first engaging member to retain the first and second engaging members being engaged with each other.

12. The collapsible electric vehicle, as recited in claim 1, wherein the vehicle frame lock further comprises a pivot linkage having one end pivotally coupled at an inner side of the pivot portion of the first positioning member and an opposed end pivotally coupled at the lower end portion of the first supporting frame.

13. The collapsible electric vehicle, as recited in claim 1, further comprising a power control system which comprises a power switch and a power circuit, wherein the power circuit is configured for controlling electrical power from the power supply to the driving mechanism, wherein the power switch is pressed by the first positioning member when the first supporting frame is unfolded and when the first positioning member is pivotally moved to the lower end portion of the first supporting frame, such that the power circuit is electrically connected, wherein when the first supporting frame is folded and when the first positioning member is pivotally move away from the lower end portion of the first supporting frame, the power switch is released and the power circuit is electrically disconnected to cut off the electrical power.

14. The collapsible electric vehicle, as recited in claim 13, wherein the vehicle frame lock further has an operating chamber formed at the lower end portion of the first supporting frame, wherein the operating chamber has an inner chamber wall, wherein the power switch is disposed at the inner chamber wall of the operating chamber of the vehicle frame lock.

15. The collapsible electric vehicle, as recited in claim 13, wherein the first positioning member further has a control portion arranged to press on the power switch when the first supporting frame is unfolded.

16. The collapsible electric vehicle, as recited in claim 1, further comprising a power control system which comprises a power controller, a sensor, and a power circuit, wherein the power circuit is electrically connected to the power supply and the driving mechanism to control an electrical power from the power supply to the driving mechanism, wherein the power controller is electrically connected to the power circuit to control the power circuit supplying the electrical power to the driving mechanism, wherein the sensor comprises a first sensor module and a second sensor module, wherein when the first supporting frame is unfolded, the first and second sensor modules are contacted with each other, such that the sensor is activated to generate an unfolding signal, wherein the power controller is configured to allow the electrical power of the power supply to the driving mechanism via the power circuit when the power controller receives the unfolding signal.

17. The collapsible electric vehicle, as recited in claim 16, wherein the power controller is configured to prevent the electric power of the power supply to be supplied to the driving mechanism thereof through the power circuit when the unfolding signal is not received.

18. The collapsible electric vehicle, as recited in claim 1, wherein the vehicle frame further comprises a driving arm, wherein two ends of the driving arm are pivotally coupled to the front vehicle member and the lower end portion of the first supporting frame of the vehicle frame respectively.

19. A vehicle frame of a collapsible electric vehicle, comprising:
a main frame; and
a first supporting frame, wherein the first supporting frame is coupled at the main frame, wherein the vehicle frame is moved between an unfolded position and a folded position, wherein when the vehicle frame is moved to the unfolded position, the first supporting frame of the vehicle frame is unfolded and retained at an upright manner for supporting a seat of the collapsible electric vehicle at a desired position, wherein when the vehicle frame is moved in the folded position, the first supporting frame of the vehicle frame is folded on the main frame, further comprising a vehicle frame lock which comprises a first positioning member and a second positioning member, wherein the first supporting frame has a lower end portion and an upper end portion, wherein the upper end portion of the first supporting frame is pivotally coupled at the lower end portion thereof, wherein the first supporting member of the vehicle frame lock is coupled at the upper end portion of the first supporting frame, wherein the second positioning member is coupled at the lower end portion of the second supporting frame, wherein the first and second positioning members are engaged with each other when the first supporting frame is unfolded and are disengaged with each other when the first supporting frame is folded.

20. The vehicle frame, as recited in claim 19, wherein the first positioning member of the vehicle frame lock has a pivot portion pivotally coupled at the upper end portion of the first supporting frame and a limiting portion extended from the pivot portion, wherein the second positioning member is movably coupled at the lower end portion of the first supporting frame in a reciprocating manner, wherein the second positioning member has a limiting end, wherein the limiting portion of the first positioning member and the limiting end of the second positioning member are arranged to be engaged with each other.

21. The vehicle frame, as recited in claim 20, wherein the first positioning member of the vehicle frame lock further has a driving face defined at the limiting portion, wherein the second positioning member further has a driven face defined at the limiting end, wherein the second positioning member is configured to bias against the driving face of the limiting portion of the first positioning member to apply a predetermined pressing force thereat, wherein when the driven face of the limiting end is pressed, the limiting end of the second positioning member is driven to move at a direction away from the first positioning member, and when the driving face is moved away from the driven face to release the pressing force, the limiting end of the second positioning member is configured to move at a direction toward the first positioning member via a restoring force.

22. The vehicle frame, as recited in claim 21, wherein the first positioning member further defines an engagement portion is configured to be moved when the limiting end of the second positioning member is driven to move toward the first positioning member by the limiting portion of the first positioning member and when the limiting end of the second positioning member is driven to subsequently move toward the first positioning member via the restoring force, the limiting end of the second positioning member is able to engage at the engagement portion of the first positioning member.

23. The vehicle frame, as recited in claim 22, wherein the engagement portion is an engaging groove formed between the pivot portion and the limiting portion of the positioning member.

24. The vehicle frame, as recited in claim 23, wherein the vehicle frame lock further comprises a first restoring member and a moving channel, wherein the second positioning member further has a driven end positioned opposite to the limiting end, wherein the moving channel of the vehicle frame lock is formed at the lower end portion of the first supporting frame, wherein the second positioning member is movably disposed at the moving channel in a reciprocating manner, wherein the first restoring member is set at the driven end of the second positioning member and the lower end portion of the first supporting frame, wherein the first restoring member is arranged for applying the restoring force to the driven end of the second positioning member so as to drive the driven end of the second positioning member for moving the second positioning member in a direction toward the first positioning member.

25. The vehicle frame, as recited in claim 24, wherein the vehicle frame lock further comprises a driving member having a driving member end, wherein the second positioning member further has a driven portion, wherein the driving member end of the driving member is positioned facing toward the driven portion of the second positioning member, wherein when the driving member is pressed, the driving member end of the driving member is moved to the driven portion of the second positioning member so as to drive the limiting end of the second positioning member moving away the first positioning member.

26. The vehicle frame, as recited in claim 19, wherein the vehicle frame lock comprises a first engaging member and a second engaging member, wherein the second engaging member is provided at the lower end portion of the first supporting frame, wherein the first and second engaging members are engaged with each other when the first supporting frame is unfolded, wherein the first and second engaging members are disengaged with each other when the first supporting frame is folded.

27. The vehicle frame, as recited in claim 26, wherein the first engaging member is provided at the first positioning member.

28. The vehicle frame, as recited in claim 27, wherein the vehicle frame lock further has an operating chamber formed at the lower end portion of the first supporting frame, wherein the operating chamber has an inner chamber wall and an operating opening, wherein the second engaging member is disposed at the inner chamber wall of the operating chamber.

29. The vehicle frame, as recited in claim 28, wherein the operating chamber further has an observation opening aligned with and facing toward the second engaging member.

30. The vehicle frame, as recited in claim 29, wherein the vehicle frame lock further comprises a second restoring member disposed between a first engaging member pivot end of the first engaging member and the second engaging member for applying an outward pushing force toward the first engaging member, such that when the first and second engaging members are engaged with each other, the outward pushing force of the second restoring member is applied to the first engaging member to retain the first and second engaging members being engaged with each other.

31. The vehicle frame, as recited in claim 19, wherein the vehicle frame lock further comprises a pivot linkage having one end pivotally coupled at an inner side of the pivot portion of the first positioning member and an opposed end pivotally coupled at the lower end portion of the first supporting frame.

\* \* \* \* \*